US012699346B2

(12) United States Patent
Matsui

(10) Patent No.: US 12,699,346 B2
(45) Date of Patent: Aug. 4, 2026

(54) IMAGE FORMING APPARATUS WITH CONTROL FOR CONTROLLING RECORDING MATERIAL CONVEYING SPEED

(71) Applicant: CANON KABUSHIKI KAISHA, Tokyo (JP)

(72) Inventor: Shotoku Matsui, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/027,102

(22) Filed: Jan. 17, 2025

(65) Prior Publication Data

US 2025/0237989 A1 Jul. 24, 2025

(30) Foreign Application Priority Data

Jan. 23, 2024 (JP) ................................ 2024-008136

(51) Int. Cl.
*G03G 15/00* (2006.01)
*G03G 15/20* (2006.01)

(52) U.S. Cl.
CPC ....... *G03G 15/6564* (2013.01); *G03G 15/205* (2013.01); *G03G 15/50* (2013.01); *G03G 15/6567* (2013.01)

(58) Field of Classification Search
CPC .. G03G 15/205; G03G 15/50; G03G 15/6564; G03G 15/6567; G03G 15/6579; B65H 9/00; B65H 29/60; B65H 29/125
See application file for complete search history.

(56) References Cited

U.S. PATENT DOCUMENTS

| | | | | |
|---|---|---|---|---|
| 11,673,756 | B2 | 6/2023 | Itoh | |
| 12,050,429 | B2 | 7/2024 | Matsui | |
| 2010/0109229 | A1* | 5/2010 | Iwakawa | B65H 9/006 271/10.13 |
| 2017/0038714 | A1* | 2/2017 | Yamana | G03G 15/2053 |
| 2020/0369483 | A1 | 11/2020 | Itoh | |
| 2025/0026600 | A1* | 1/2025 | Sugiyama | B65H 29/125 |
| 2025/0164914 | A1* | 5/2025 | Suzuki | G03G 15/6567 |

FOREIGN PATENT DOCUMENTS

| | | | |
|---|---|---|---|
| JP | 2009-192633 | A | 8/2009 |
| JP | 2018-202769 | A | 12/2018 |
| JP | 2020-184026 | A | 11/2020 |
| JP | 2020-190656 | A | 11/2020 |

* cited by examiner

*Primary Examiner* — Sophia S Chen
(74) *Attorney, Agent, or Firm* — Venable LLP

(57) ABSTRACT

An image forming apparatus includes a photosensitive drum, a first roller, a first motor, a second roller, a second motor, an intermediary transfer member, a transfer member, a sensor unit, and a controller. The controller is capable of executing first control for controlling a recording material conveying speed by controlling the first motor on the basis of the sensor unit and second control for controlling the recording material conveying speed by controlling the first motor and the second motor before executing the first control. The controller controls the first and second motors in the second control so that a recording material conveying speed of the recording material positioned on a side upstream of the sensor unit with respect to a conveying direction of the first roller is decelerated or so that conveyance of the recording material is stopped and then the recording material conveying speed is accelerated.

6 Claims, 15 Drawing Sheets

(a)

(b)

(a)

(b)

IMAGE FORMING APPARATUS WITH CONTROL FOR CONTROLLING RECORDING MATERIAL CONVEYING SPEED

FIELD OF THE INVENTION AND RELATED ART

The present invention relates to an image forming apparatus, for example, an image forming apparatus utilizing an electrophotographic process or the like.

The image forming apparatus (for example, a copying machine, a printer) using an intermediary transfer member forms a toner image on a photosensitive drum (image bearing member) by a developing roller and primarily transfers this toner image onto the intermediary transfer member. Thereafter, the toner image on the intermediary transfer member is collectively secondarily transferred onto a recording material such as paper (sheet) or the like, and then the recording material on which the toner image is transferred is passed through a fixing device, so that an image is formed on a recording material. In such an image forming apparatus, depending on a stacking amount of recording material(s) in a cassette, a taking-out amount by preceding paper, an abrasion state of a sheet (paper) feeding roller, a kind of media (recording materials), and the like, a variation in arrival timing of the recording material at a secondary transfer position after the recording material is fed into the image forming apparatus occurs.

In Japanese Laid-Open Patent Application No. 2009-192633, the following control is executed. In order to align the image transferred on the intermediary transfer member with a leading end of the recording material, a time difference between the recording material leading end and the image is detected at a timing when the recording material leading end is detected by a conveyance sensor provided upstream of a secondary transfer portion (hereinafter, this sensor is referred to as a registration sensor). Then, a conveying speed of the recording material is accelerated and/or decelerated, or is once stopped so as to eliminate the detected time difference until the recording material reaches a secondary transfer roller, so that transfer accuracy is improved.

Hereinafter, such control is referred to as a conveying speed control.

In the image forming apparatus, in the case where conveyance of a recording material to the secondary transfer position is performed by a plurality of conveying rollers different in driving source and the recording material with a size such that the recording material is conveyed in a state in which the recording material extends over the plurality of conveying rollers is used, the following problem arises. That is, when a state in which drive of one driving source is stopped and another driving source is driven is formed in the conveying speed control, the recording material is damaged in some cases.

SUMMARY OF THE INVENTION

The present invention has accomplished in such circumstances. A principal object of the present invention is to normally form an image without having the influence on a recording material in an image forming apparatus in which conveyance of the recording material to a secondary transfer position is executed by a plurality of driving sources.

According to an aspect of the present invention, there is provided an image forming apparatus comprising: a photosensitive drum configured to carry a toner image; a first roller configured to convey a recording material; a first motor configured to drive the first roller; a second roller configured to convey the recording material conveyed by the first roller; a second motor configured to drive the second roller and different from the first motor; an intermediary transfer member onto which the toner image is transferred from the photosensitive drum; a transfer member configured to transfer the toner image from the intermediary transfer member onto the recording material; a sensor unit provided on a side upstream of the transfer member with respect to a conveying direction of the first roller; and a controller, wherein the controller is capable of executing first control for controlling a recording material conveying speed by controlling the first motor on the basis of the sensor unit and second control for controlling the recording material conveying speed by controlling the first motor and the second motor before executing the first control, and wherein the controller controls the first motor and the second motor in the second control so that he recording material conveying speed of the recording material positioned on a side upstream of the sensor unit with respect to the conveying direction of the first roller is decelerated or so that conveyance of the recording material is stopped and then the recording material conveying speed is accelerated.

Further features of the present invention will become apparent from the following description of exemplary embodiments with reference to the attached drawings.

BRIEF DESCRIPTION OF THE DRAWINGS

Parts (a) and (b) of FIG. 1 are schematic sectional views of a laser printer and a process cartridge, respectively, in reference embodiments 1 and 2 and embodiments 1 and 2.

DESCRIPTION OF THE EMBODIMENTS

In the following, embodiments of the present invention will be described with reference to the drawings. Incidentally, the following embodiments do not restrict the invention according to the appended claims, and all of combinations of features described in the embodiments are not necessarily essential for solution of the invention.

Reference Embodiment 1

Figure 1:
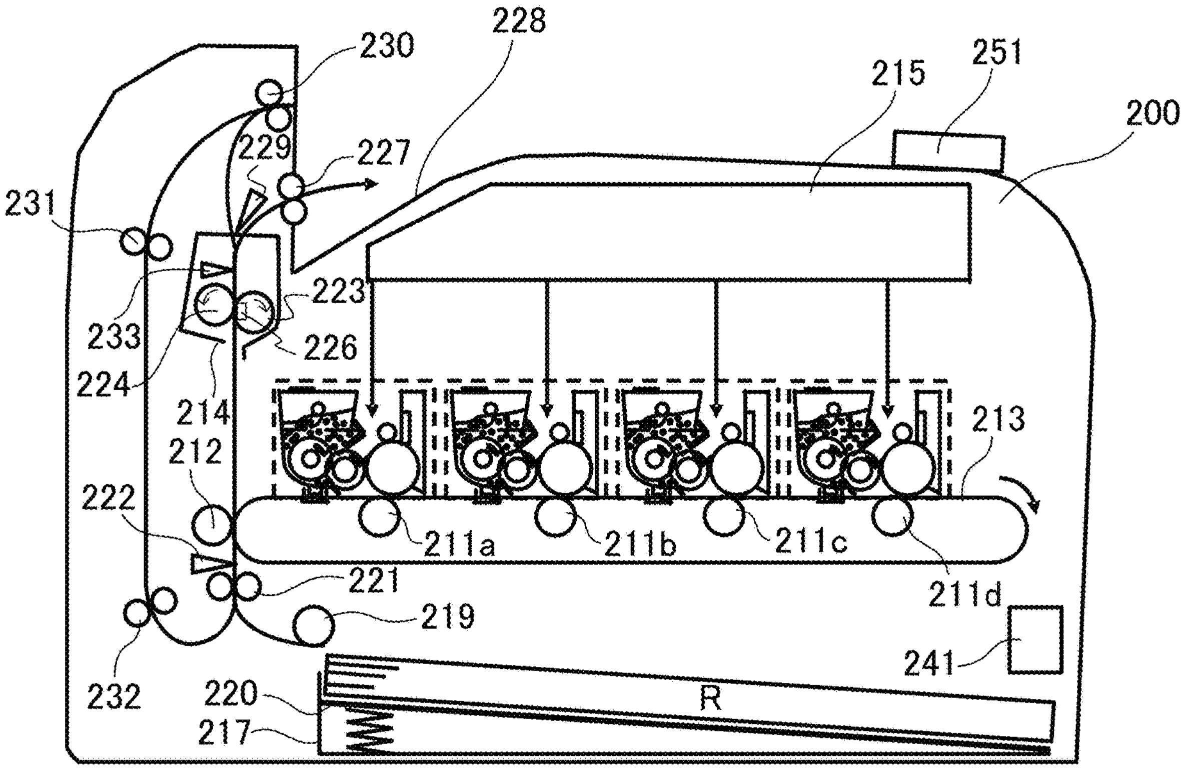
Figure 1:
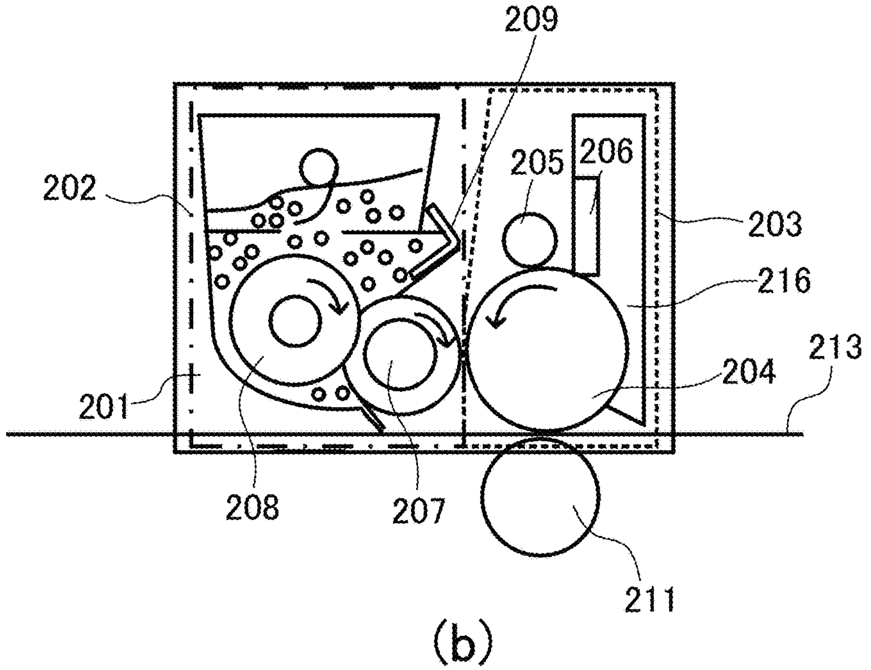

Parts (a) and (b) of FIG. 1 are schematic structural views showing an image forming apparatus 200 of a reference embodiment 1. Part (a) of FIG. 1 is the schematic structural view of entirety of the image forming apparatus 200, and part (b) of FIG. 1 is the schematic structural view of an enlarged one of process cartridges which are image forming means of the entirety of the image forming apparatus 200. However, constituent parts, dimensions, arrangement, and the like in the embodiment should be appropriately changed and do not limit the scope of the invention.

(General Structure of Image Forming Apparatus)

With reference to FIG. 1, a general structure of the image forming apparatus 200 will be described. FIG. 1 shows a schematic structure of the image forming apparatus 200 of the reference embodiment 1 in cross section, and simply shows each of constituents.

The image forming apparatus 200 of the reference embodiment 1 is provided with a plurality of process cartridges 201. Each of the process cartridges 201 is formed by a developing unit 202 and a photosensitive drum unit 203. The photosensitive drum unit 203 comprises a photosensitive drum 204 which is an image bearing member of an electrostatic latent image, a charging roller 205 which is a charging means for electrically charging the photosensitive drum 204, and a cleaning blade 206 which is a cleaning means for the photosensitive drum 204.

The image forming apparatus 200 is provided with a transfer roller 211 in a position opposing the photosensitive drum 204 in order to transfer a toner image from the photosensitive drum 204 onto an intermediary transfer belt 213 which is an intermediary transfer member. Incidentally, as regards transfer rollers 211*a*, 211*b*, 211*c*, and 211*d* in part (a) of FIG. 1, suffixes a, b, c, and d of reference numerals represent different colors (for example, yellow, magenta, cyan, black, and the like).

The photosensitive drum unit 203 is provided with the cleaning blade 206 for removing toner remaining on the photosensitive drum 204 without being transferred onto the intermediary transfer belt 213. Further, at a periphery of the photosensitive drum 204, the developing unit 202 is mounted. The developing unit 202 is provided with a developing roller 207 which is a developing means, a supplying member 208, and a developing blade 209 which is a regulating member.

The developing roller 207 is a roller for carrying the toner which is a developer and for developing an electrostatic latent image, formed on a surface of the photosensitive drum 204, with the carried toner. The supplying member 208 is a member disposed at the periphery of the developing roller 207 and for supplying the toner to the developing roller 207 and for peeling-off the toner from the developing roller 207. The developing blade 209 is a regulating member for regulating the supplied toner to a predetermined toner amount.

The toner image formed on each photosensitive drum 204 is transferred from each photosensitive drum 204 onto the intermediary transfer belt (intermediary transfer member) 213, so that a full-color image is formed on the intermediary transfer belt 213 (primary transfer).

The toner images formed on the intermediary transfer belt 213 are transferred by a secondary transfer roller 212 which is a transfer means onto a recording material R conveyed by being timed to the toner image (secondary transfer). In the following, a position where the toner images are transferred from the intermediary transfer belt 213 onto the recording material R by the secondary transfer roller 212 is a secondary transfer position (transfer position) or a secondary transfer portion.

Unfixed toner transferred on the recording material R is fixed on the recording material R by applying heat and pressure thereto when passing through a fixing device 214. Incidentally, the fixing device 214 includes a heater 226, and is provided downstream of a registration roller 221 described later and the secondary transfer position with respect to a conveying direction of the recording material R.

An exposure unit 215 for forming the electrostatic latent image corresponding to image data on the charged photosensitive drum 204 is mounted in the image forming apparatus 200. In the image forming apparatus 200, power sources (not shown) for applying predetermined voltages to the charging roller 205, the developing roller 207, the developing blade 209, the supplying member 208, and the transfer rollers 211 are mounted.

A controller (control portion) 241 executes drive of the process cartridges 201 and the fixing device 214, voltage control and control of a transfer timing to the recording material R or the like timing, and includes an engine controller 302 described later. The controller 241 is connected to a controller (not shown) and receives, as a print command, information obtained by converting a print image size of an image color, for a print instruction from a user, into laser light emission.

The image forming apparatus 200 is provided with an operation display portion 251. The operation display portion 251 is provided with various well-known inputting means for inputting various pieces of information by the user and various well-known display means for displaying the various pieces of information. For example, the user is capable of setting a sheet size, a paper kind (plain paper, thin paper, thick paper, etc.), and the like of the recording material R subject to printing by using an operation display portion 251.

For example, the engine controller 302 described later discriminates that the recording material R is long paper described later, on the basis of information inputted from the operation display portion 251. The engine controller 302 can also discriminate that the recording material R is the long paper, on the basis of an output signals of a registration sensor 222 or a discharge sensor 233 described later. Incidentally, the information indicating that the recording material R is the long paper may also be inputted from an external device connected to the image forming apparatus 200 by a cable or radio (wireless).

(Image Forming Operation)

The exposure unit 215 for exposing the charged photosensitive drum 204 to light executes exposure of the photosensitive drum 204 with a laser beam depending on the image data in a main scan direction. The light exposure in the main scan direction is executed while being timed to that in a sub-scan direction. As a result, the electrostatic latent image is formed on the photosensitive drum 204. Here, a portion where the image is formed on the photosensitive drum 204 (hereinafter, this portion is referred to as an image forming portion) has a light potential. Incidentally, the main scan direction refers to a rotational axis direction of the photosensitive drum 204, and the sub-scan direction refers to a rotation movement direction of the photosensitive drum 204, i.e., a direction perpendicular to the rotational axis direction.

The developing roller 207 mounted in the developing unit 202 carries the toner as a developer, and contacts the photosensitive drum 204 during image formation, and thus develops the electrostatic latent image into the toner image with the toner. Development is performed by a potential difference between a light potential and a potential of the developing roller, and therefore, a predetermined developing voltage is applied to the developing roller 207. The developing roller 207 is rotated in an opposite direction to a rotational direction of the photosensitive drum 204, and is rotated at a surface speed thereof providing a speed difference thereof from a surface speed of the photosensitive drum 204. For the toner, as an external additive, a charge assisting agent such as silica or titanium oxide is used, and flowability and chargeability of the toner are controlled by the external additive. The toner image developed from the electrostatic latent image on the photosensitive drum 204 is sent to a contact portion (primary transfer portion) between the intermediary transfer belt 213 and the photosensitive drum 204 and is transferred onto the intermediary transfer belt 213. A predetermined transfer voltage is applied to the transfer roller 211 by a power source (not shown) so that a predetermined potential difference is generated between the transfer roller 211 and the photosensitive drum 204.

The toner which is not transferred in the primary transfer portion is removed by the cleaning blade 206. The cleaning blade 206 is mounted so as to oppose a rotational direction of the photosensitive drum 204 (i.e., in a counter direction). The cleaning blade 206 is contacted to the photosensitive drum 204 with appropriate contact pressure in the counter direction, so that the remaining toner can be reliably removed from the photosensitive drum 204. The removed toner is accommodated in a residual toner accommodating chamber 216. The toner is removed by cleaning, so that the surface of the photosensitive drum 204 can be charged again by the charging roller 205 in a state in which there is no toner and the like thereon.

By repeating such steps, the toner image can be formed on the intermediary transfer belt 213.

Thereafter, the toner images of associated colors are successively transferred superposedly from the plurality of process cartridges onto the intermediary transfer belt 213, so that a superposed full-color image is formed. The full-color image is transferred onto the recording material R conveyed by being timed thereto by the secondary transfer roller 212.

(Recording Material Conveying Operation)

A sheet (paper) feeding portion 217 is a sheet (paper) feeding cassette as a recording material storing means for storing the recording material R, particularly a recording material accommodating means for accommodating recording paper on which the image is formed. When the sheet (paper) is fed from the sheet feeding portion 217, a bottom plate 220 is raised by driving a pick-up roller 219 driven by a driving source (not shown), so that the recording materials R placed in the sheet feeding portion 217 are pushed up. A most upper (one) sheet of the pushed-up recording materials R is contacted to the pick-up roller 219, and the recording materials R are separated and fed one by one through rotation of the pick-up roller 219, so that the fed recording material R is conveyed to the registration roller 221 which is a first conveying means. The recording material R fed from the sheet feeding portion 217 is conveyed by the registration roller (first roller) 221 driven by a sheet feeding motor (first motor) 332 described later.

The recording material R is conveyed to the secondary transfer portion so that a leading end of the image and a leading end of the recording material R coincide with each other, on the basis of a timing when arrival of the leading end of the recording material R is detected by the registration sensor 222. The registration sensor 222 is provided upstream of the secondary transfer portion with respect to a conveying direction and functions as a detecting means for detecting the recording material R. The registration sensor 222 is capable of detecting a timing (timing when the leading end of the recording material R reaches the registration roller 221) when conveyance of the recording material R by the registration roller 221 is started.

In the secondary transfer portion, onto the recording material R, the toner image is transferred from the intermediary transfer belt 213. Thereafter, the recording material R on which the unfixed toner image is transferred is sent to the fixing device 214. The fixing device 214 is for fixing a secondarily transferred visible image (toner image) on the recording material R.

The fixing device 214 is provided with a fixing roller 223 for heating the recording material R and a pressing roller 224 for bringing the recording material R into press contact with the fixing roller 223. The fixing roller 223 and the pressing roller 224 of the fixing device 214 are disposed so as to be rotatable in arrow directions by a fixing motor (second motor) 352 described later. Inside the fixing roller 223, a heater 226 is incorporated. By this, the recording material R holding the visible image is conveyed, and in addition is heated and pressed by the fixing roller 223 and the pressing roller 224, so that melted toner is fixed on the recording material R.

A discharging roller pair 227 is rotated by the fixing motor 352 described later, and discharges the recording material R, after the visible image is fixed on the recording material R by the fixing device 214, onto a stacking portion 228. The above is an operation in the case where printing of the image only on a first surface (side) of the recording material R (hereinafter, referred to as one-side printing) is ended or in the case where printing of the images on not only on the first side but also on a second surface (side) opposite from the first side (hereinafter, referred to as double-side printing).

(Reversing Path)

The image forming apparatus 200 of the reference embodiment 1 is capable of executing the double-side printing for forming images on the first surface (also referred to as a front surface) and the second surface (also referred to as a back surface) opposite from the first surface.

A reversing portion is provided with a flapper 229, a reversing roller pair 230 including a reversing roller (second roller) which is a second conveying means and conveying roller pairs 231 and 232 including a conveying roller (first roller) which is a first conveying means. The conveying roller pairs 231 and 232 are provided in a double-side conveying path.

The flapper 229 changes a conveying path of the recording material R passed through the fixing roller 223 and the pressing roller 224. The flapper 229 is constituted so that the conveying path is capable of being switched to a direction of the discharging roller pair 227 and a direction of the reversing roller pair 230 by a reversing solenoid 345 described later.

The fixing motor 352 is capable of rotating the reversing roller of the reversing roller pair 230 in a direction in which the recording material R is drawn into the reversing portion or rotating the drawn recording material R so as to convey in a direction of the conveying roller pair 231. The fixing motor 352 is capable of rotating the reversing roller of the reversing roller pair 230 in a first direction and a second direction opposite to the first direction. Switching of the rotational direction of the reversing roller pair 230 is constituted so as to be interrelated with movement of the flapper 229.

The conveying roller pairs 231 and 232 are constituted so that the recording material R passed through the fixing device 214 can be conveyed in the direction of the secondary transfer roller 212. Driving forces are supplied to the discharging roller pair 227, the reversing roller pair 230, the fixing device 214, the pick-up roller 219, the registration roller 221, and the conveying roller pairs 231 and 232 by driving sources (the sheet feeding motor 332 and the fixing motor 352). The discharging roller pair 227, the reversing roller pair 230, and the fixing device 214 are driven by the fixing motor 352. The pick-up roller 219, the registration roller 221, and the conveying roller pairs 231 and 232 are driven by the sheet feeding motor 332.

Further, the reversing portion is provided with a double-side clutch 243 described later, and the conveying roller pairs 231 and 232 are rotated or rotation-stopped by the double-side clutch 243.

(Conveyance of Recording Material R in Reversing Portion)

A conveying operation in the reversing portion includes reversal of the conveying direction and conveyance from a reversing path toward the registration roller 221. In a reversing operation of the conveying direction, on the basis of a timing when the leading end of the recording material R reaches the discharge sensor 233, the reversing portion drives the reversing solenoid 345 for changing a position of the flapper 229. The reversing portion changes the conveying direction of the recording material R after the visible image is fixed by the fixing device 214, and guides the recording material R to the reversing roller pair 230. The reversing portion stops drive of the reversing solenoid 345 on the basis of a timing when a trailing end of the recording material R comes out of the discharge sensor 233, and changes the rotational direction of the reversing roller pair 230, so that the recording material R is conveyed in a direction of the reversing path.

In conveyance from the reversing path toward the registration roller 221, the reversing portion supplies a driving force to the conveying roller pairs 231 and 232 by driving the double-side clutch 243, and rotates the conveying roller pairs 231 and 232, and then executes conveying speed control (first control) described later at the time when the registration sensor 222 detects the recording material R. In the case where once stopping control is selected in the conveying speed control for the recording material R conveyed from the reversing path, the reversing portion stops the drive of the double-side clutch 243, and stops supply of the driving force to the conveying roller pairs 231 and 232.

(Function Block Diagram)

Figure 2:
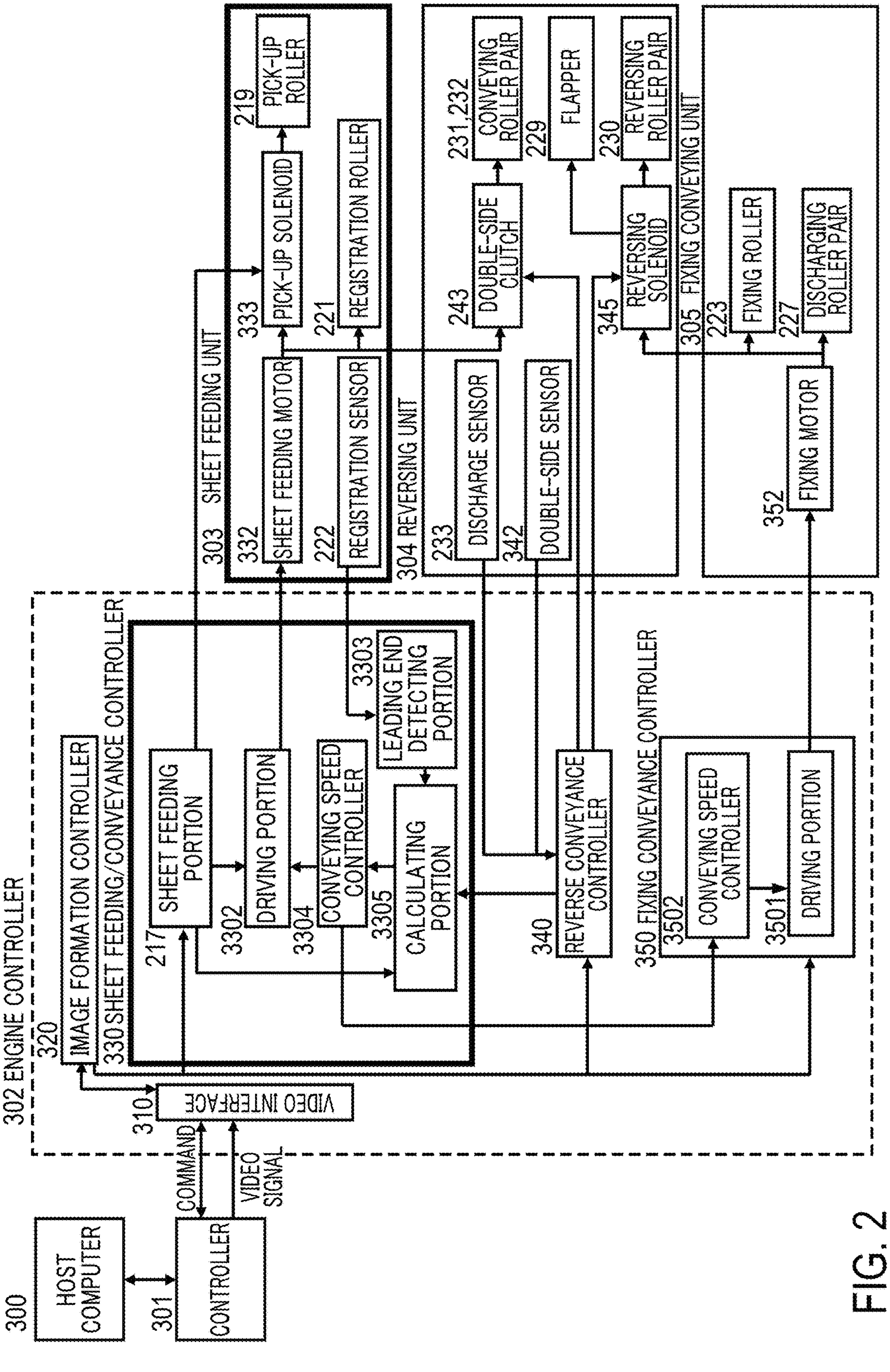
FIG. 2 is a schematic system block diagram of the laser printer in the reference embodiments 1 and 2 and the embodiments 1 and 2.

FIG. 2 is a function block diagram relating to the engine controller 302 of the laser printer as the image forming apparatus 200. In the following, a function block relating to conveyance control of the recording material R during printing will be described. The controller (portion) 301 is capable of mutually communicating with a host computer 300 and the engine controller 302. When print data is received (inputted) from the host computer 300, the controller 301 develops the print data and converts the print data into image data for forming the image. Then, a video signal for light exposure corresponding to four colors for performing the light exposure on the basis of the image data is generated.

When generation of the video signal is completed, the controller 301 provides a print start instruction to a video interface portion 310 of the engine controller 302 as a control means. The engine controller 302 incorporates a ROM (read only memory) and a RAM (random access memory), and includes a microcomputer (not shown) containing a microprocessor as a CPU (central processing unit). The engine controller 302 transmits and receives information between itself and the controller 301 by serial communication, and executes control described later, on the basis of the information transmitted to and received from the controller 301.

When the video interface portion 310 receives the print start instruction from the controller 301, the video interface portion 310 sends the print start instruction to an image formation controller 320 of the engine controller 302. On the basis of a received print start instruction, the image formation controller 320 activates various actuators and starts preparation for image formation. When the preparation for the image formation is completed, the image formation controller 320 notifies the controller 301 of image formation preparation completion via the video interface portion 310.

When the controller 301 receives the image formation preparation completion, the controller 301 transmits a video signal to the video interface portion 310. The image formation controller 320 carries out the image formation on the basis of the video signal received by the video interface portion 310.

A sheet feeding/conveyance controller 330 of the engine controller 302 includes the sheet feeding portion 217, a driving portion 3302 of the sheet feeding motor 332, a leading end detecting portion 3303 of the recording material R, a conveying speed controller 3304 of the sheet feeding motor 332, and a calculating portion 3305 for calculating a control timing of the conveying speed. On the basis of a print start timing received by the image formation controller 320, the pick-up roller 219 is rotated by a pick-up solenoid 333 and the sheet feeding motor 332 which is a first driving means which are included in the sheet feeding unit 303. By this, the recording materials R stack in the sheet feeding portion 217 are separated and fed one by one. By this, the sheet feeding/conveyance controller 330 sends the recording material R toward the registration sensor 222. The recording material leading end detecting portion 3303 detects that the recording material R reached the registration sensor 222.

The calculating portion 3305 calculates the conveying speed and the conveying speed control timing at a timing when the leading end of the recording material R reached the registration sensor 222. Incidentally, a calculating method of the conveying speed and the conveying speed control timing will be described later. The conveying speed controller 3304 of the sheet feeding motor 332 controls a speed of the sheet feeding motor 332 by the driving portion 3302 of the sheet feeding motor 332 at the conveying speed control timing calculated by the calculating portion 3305, and thus causes the image leading end and the recording material leading end to coincide with each other in the secondary transfer portion. The sheet feeding/conveyance controller 330 controls the conveying speed by controlling the sheet feeding motor 332 so that the toner image on the intermediary transfer belt 213 is transferred onto the recording material R in the secondary transfer position depending on that the leading end of the recording material R reached the registration sensor 222. Specifically, the sheet feeding/conveyance controller 330 carries out conveying speed control (S1 described later) which is first control in which the sheet feeding motor 332 is accelerated or decelerated or in which the feeding of the recording material R is stopped.

A fixing conveyance controller 350 of the engine controller 302 includes a conveying speed controller 3502 for the fixing motor 352 and a driving portion 3501 for the fixing motor 352. The fixing conveyance controller 350 controls the fixing motor 352 which is a second driving means included in the fixing conveyance unit 305, on the basis of the print start timing of the image formation controller 320, and conveys the recording material R by the fixing roller 223 and the discharging roller pair 227 which use the fixing motor 352 as a driving source.

On the basis of the print start timing of the image formation controller 320, the reverse conveyance controller 340 of the engine controller 302 controls the double-side clutch 243 and the reversing solenoid 345 on the basis of detection timings of the discharge sensor 233 and a double-side sensor 342 which are included in the reversing unit 304. By this, the reverse conveyance controller 340 controls reversal and discharge of the recording material R. The reverse conveyance controller 340 controls the reversing solenoid 345, so that a rotational direction of the reversing roller pair 230 driven by the fixing motor 352 as a driving source is switched, and in addition, a conveying path of the recording material R is switched to the reversing portion or the stacking portion 228 by the flapper 229. Further, the conveying roller pairs 231 and 232 are driven by the sheet feeding motor 332 as the driving source, and by controlling the double-side clutch 243, stop of the drive and the drive of the conveying roller pairs 231 and 232 can be switched.

(Conveyance Speed Control in Case Where Long Paper is Subjected to Double-Side Conveyance)

Figure 3:
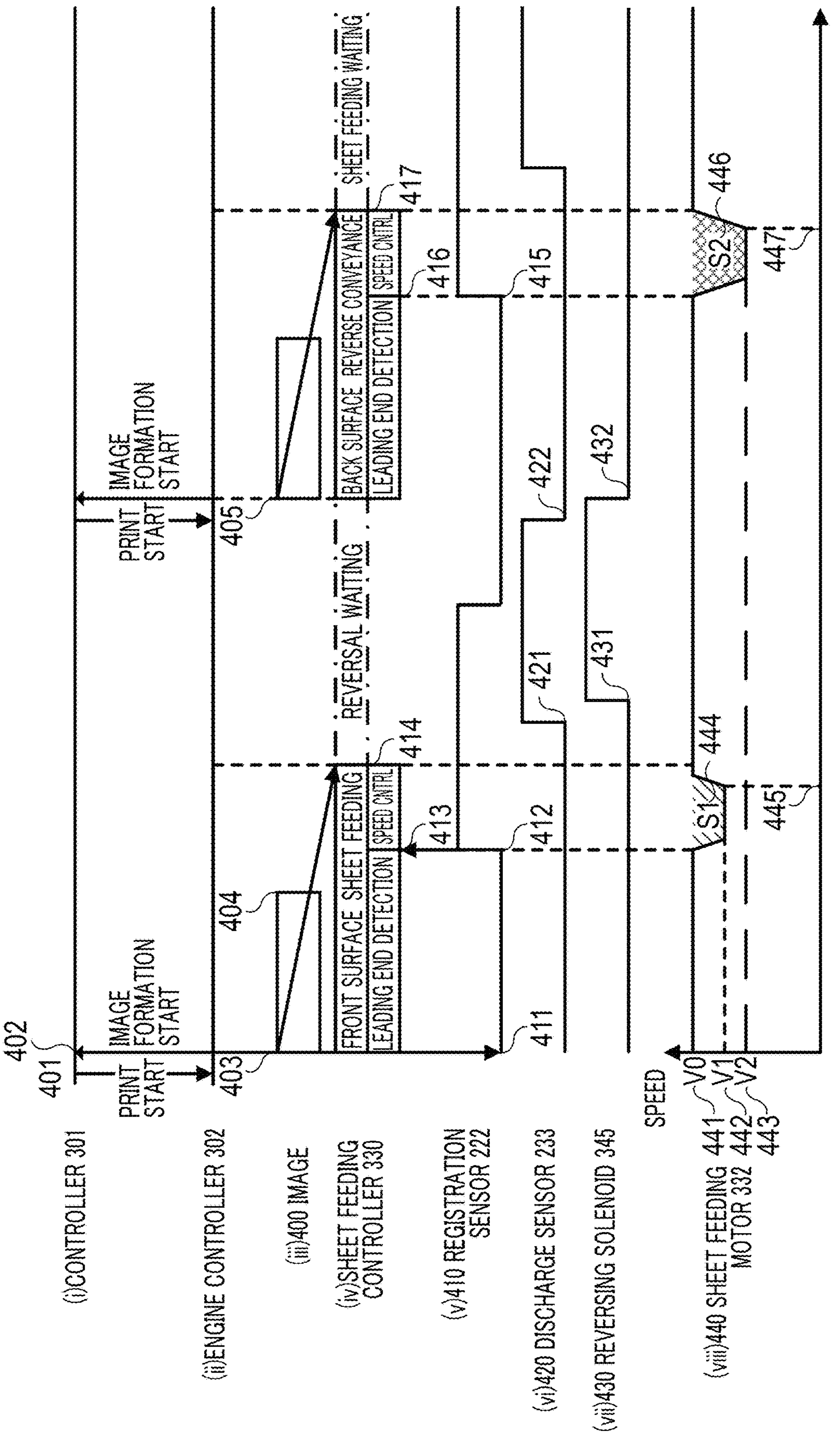
FIG. 3 is a timing chart showing conveying speed control during double-side printing of long paper in the reference embodiment 1.
Figure 4:
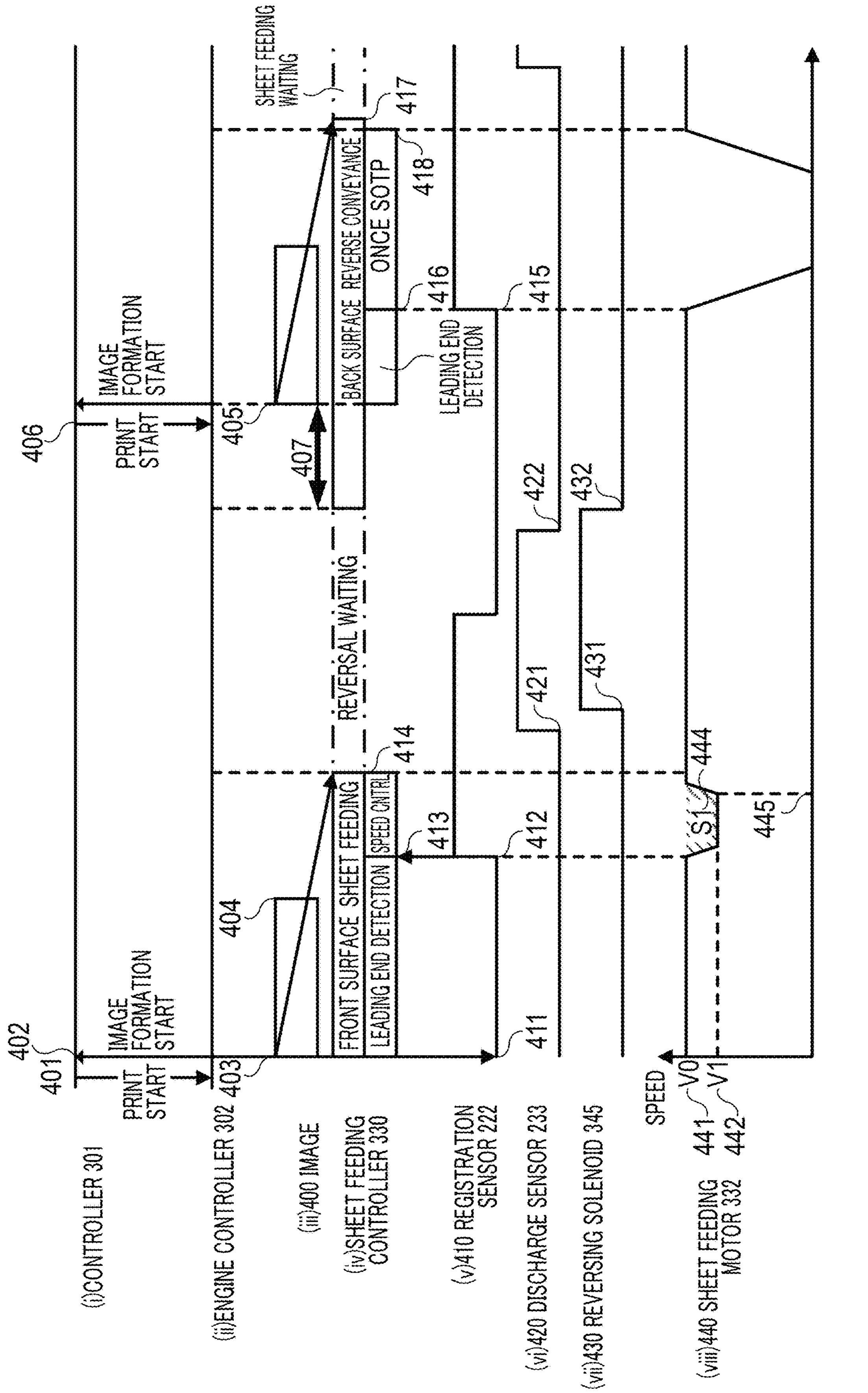
FIG. 4 is a timing chart showing another conveying speed control during the double-side printing of the long paper in the reference embodiment 1.

Next, the conveying speed control in the case where long paper is subjected to double-side printing will be described using FIGS. 3 and 4. The conveying speed control is control such that in the case where the leading end of the recording material R is detected by the registration sensor 222, the leading end of the recording material R and the leading end of the image on the intermediary transfer belt 213 are caused to coincide with each other in the secondary transfer portion by controlling the conveying speed of the recording material R by accelerating or decelerating the motor or by once stopping the drive of the motor. FIG. 3 is a timing chart of conveying speed control in which the leading end of the recording material R and the image leading end are caused to coincide with each other by executing acceleration and deceleration of the motor. FIG. 4 is a timing chart of conveying speed control in which the leading end of the recording material R and the image leading end are caused to coincide with each other by once stopping the drive of the motor.

In FIGS. 3 and 4, (i) shows a timing of a command transmitted from or received by the controller 301. (ii) shows a timing of a command transmitted from or received by the engine controller 302. (iii) shows a timing of the image on the intermediary transfer belt 213 (400). (iv) shows states (front surface sheet feeding, reversal waiting, back surface reversal conveyance, sheet feeding waiting, and the like) of control of the sheet feeding/conveyance controller 330. (v) shows an output signal (low level or high level) of the registration sensor 222 (410), and (vi) shows an output signal (low level or high level) of the discharge sensor 233 (420). (viii) shows a state of the reversing solenoid 345 (430) and shows stop of the drive at the low level and the drive at the high level. (viii) shows a speed (440) of the sheet feeding motor 332. Incidentally, the speed of the sheet feeding motor 332 is between a maximum speed and a minimum speed of the sheet feeding motor 332 and is capable of being, for example, V0(441), V1(442), V2(443), and the like. The abscissa shows a time.

Incidentally, the long paper in this constitution is defined as a recording material R having a length Ls not less than a distance from the reversing roller pair 230 to the registration sensor 222, but a length causing a problem is different depending on a device constitution. That is, in the case where the length of the recording material R is not less than a distance from the registration sensor 222 to the second conveying means (second roller) driven by the second driving means (second motor), the recording material R is the long paper.

The engine controller 302 discriminates that the recording material R is the long paper, on the basis of information inputted from the operation display portion 251 or information received from the controller 301. The engine controller 302 is also capable of discriminating whether or not the recording material R is the long paper, on the basis of the output signal of the registration sensor 222 or the discharge sensor 233. Further, for discrimination as to whether or not the recording material R is the long paper, it is also possible to use a sensor other than the registration sensor 222 and the discharge sensor 233. In this case, the engine controller 302 measures the length of the recording material R by the registration sensor 222 or the discharge sensor 233 during one-side printing for the recording material R and thus is capable of discriminating whether or not the recording material R is the long paper.

That is, the image forming apparatus 200 includes the sensor for detecting the length of the recording material R, and it can be said that the registration sensor 222 or the discharge sensor 233 is a part of the sensor.

In this embodiment, the registration sensor 222, the discharge sensor 233, or the like as the sensor for detecting the recording material R can be a sensor including a contact member movable in contact with the recording material R and a detecting portion for detecting movement of the contact member. The detecting portion optically detects the contact member or a portion-to-be-detected movable in interrelation with the contact member, and thus can detect the movement of the contact member.

Figure 5:
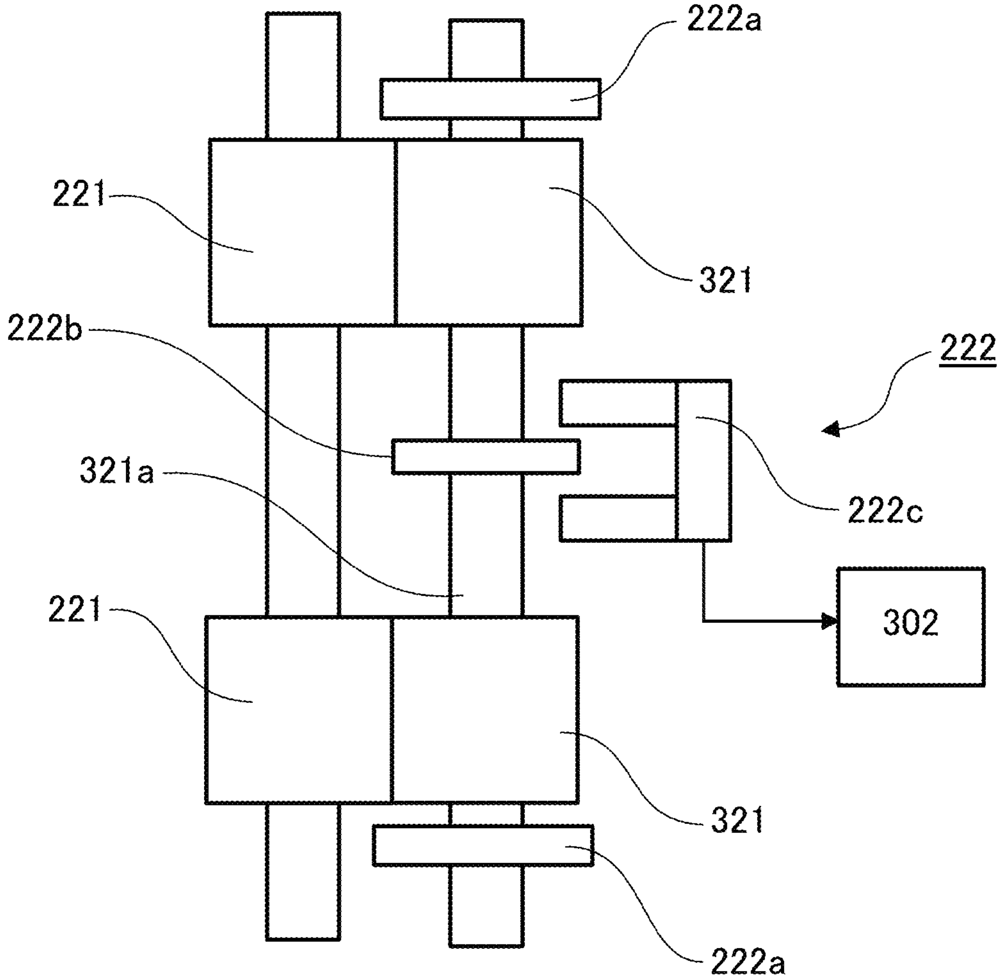
FIG. 5 is a schematic view showing a structure of a registration sensor in the reference embodiments 1 and 2.

In FIG. 5, a structure of the registration sensor 222 in this embodiment is shown. The registration sensor 222 includes a contact portion 222*a* movable in contact with the recording material R, a portion-to-be-detected 222*b*, and a detecting portion 222*c* for detecting movement of the contact portion 222*a* by detecting movement of the portion-to-be-detected 222*b*.

The contact portion 222*a* and the portion-to-be-detected 222*b* are mounted on a rotation shaft 321*a* of a driven roller 321 contacting the registration roller 221.

Further, the contact portion 222*a* of the registration sensor 222 in this embodiment has a function of correcting oblique movement of the recording material R in contact with the recording material R. The contact portion (shutter) 222*a* is provided in plurality with respect to a rotational axis direction of the registration roller 221. The contact portion 222*a* has the function of correcting the oblique movement in contact with the recording material R before the leading end of the recording material R reaches a nip of a registration roller pair (the registration roller 221 and the driven roller 321). The contact portion 222*a* is moved by being pushed by the leading end of the recording material R, so that the recording material R of which oblique movement is corrected is conveyed by the registration roller pair, and the registration sensor 222 detects the leading end of the recording material R. With respect to the conveying direction of the recording material R, the registration sensor 222 and the registration roller 221 are disposed in front of the secondary transfer position.

Incidentally, as the sensor for detecting the recording material R, it is also possible to use a sensor for optically detecting the recording material R and a sensor employing another type.

(Conveying Speed Control: Acceleration and Deceleration)

Using the timing chart of FIG. 3, the conveying speed control in which in the case where the long paper is conveyed, the leading end of the recording material R and the image leading end are caused to coincide with each other by executing the acceleration and the deceleration of the sheet feeding motor 332 will be described. First, the controller 301 transmits a print start command 401 to the engine controller 302. The engine controller 302 starts print preparation when the engine controller 302 receives the print start command 401, and provides a sheet feeding preparation start to the sheet feeding/conveyance controller 330.

Next, the engine controller 302 provides an image formation start instruction 402 to the controller 301 when preparation of the image formation is completed. When the controller 301 receives the image formation start instruction 402, the controller 301 starts transmission of the video signal when receiving the image formation start instruction 402, and the engine controller 302 starts the image formation (403) on the basis of a receiving video signal. An image (400) formed by the image formation controller 320 enters the secondary transfer portion after a predetermined time has elapsed. On the other hand, the sheet feeding/conveyance controller 330 starts the sheet feeding of the recording material R and then continues conveyance of the recording material R at a speed V0 (441). The sheet feeding/conveyance controller 330 causes the registration sensor 222 to start detection of the leading end of the recording material R on the basis of an image formation start timing (403) of the image formation controller 320 (411). The speed V0 is a speed at which the recording material R is conveyed in the secondary transfer portion, and is hereinafter referred to as a transfer execution speed V0.

Thereafter, the sheet feeding/conveyance controller 330 starts the conveying speed control (acceleration and deceleration) (413) at a timing (412) when the leading end of the recording material R reaches the registration sensor 222. The sheet feeding/conveyance controller 330 calculates the following amount in order to cause the recording material R to enter the secondary transfer portion by matching timings the leading end of the recording material R and the image leading end. That is, the sheet feeding/conveyance controller 330 calculates a preceding amount S1(444) which is a distance (preceding distance) in which the recording material R precedes the image, from a difference between a distance from the leading end of the recording material R to the secondary transfer roller 212 and a distance from the image leading end to the secondary transfer roller 212. Incidentally, as shown in (viii) of FIG. 3, in a graph between the time and the speed, the preceding amount S1 is represented by an area of a trapezoid. The sheet feeding/conveyance controller 330 determines a speed V1(442) for delaying conveyance of the recording material R by an amount corresponding to the calculated preceding amount S1(444), and determines a timing (445) when the speed is returned to the transfer execution speed V0(441) in the secondary transfer portion. Incidentally, the recording material R precedes the image, and therefore, the speed V1 is a speed slower than the transfer execution speed V0 (V1<V0).

Here, precedence of the recording material R refers to a state in which when the conveyance of the recording material R is continued as is, the recording material R reaches the secondary transfer position at a timing earlier than that of the toner image on the intermediary transfer belt 213. On the other hand, the case where the toner image on the intermediary transfer belt 213 reaches the secondary transfer position at a timing earlier than that of the recording material R refers to that the image precedes the recording material R. Incidentally, in the case where the recording material R precedes the image, control in which a timing when the toner image to be transferred onto the intermediary transfer belt 213 is made early can be considered. However, development of image data takes much time in some instances, and in this case, eventually, the recording material R precedes the image, and therefore, deceleration of the conveying speed of the recording material R or conveyance of the recording material R is once stopped. At the determined speed V1 and timing (445), the sheet feeding/conveyance controller 330 drives the sheet feeding motor 332 which is a driving source for the registration roller 221 nipping the recording material R. By this, the image leading end and the leading end of the recording material R are caused to coincide with each other, and the sheet feeding/conveyance controller 330 waits until the recording material R is fed again from the reversing path (414).

Next, the engine controller 302 starts formation of an image on a back surface of the recording material R (405) similarly as the case of the front surface at an arbitrary timing after an end (404) of the image formation. As described in the recording material conveying operation and the recording material conveyance control with reference to FIG. 1, after the transfer of the image on the recording material R, the image is fixed on the recording material R by the fixing device 214. On the basis of a timing 421 when the leading end of the recording material R reaches the discharge sensor 233, the reversing solenoid 345 (430) is driven (431), the conveying direction of the recording material R is changed in the direction of the reversing roller pair 230.

Thereafter, on the basis of a timing 422 when the trailing end of the recording material R comes out of the discharge sensor 233, the drive of the reversing solenoid 345(430) is stopped (432), and the rotational direction of the reversing roller pair 230 is changed, so that conveyance of the recording material R along the reversing path is executed. During the conveyance of the recording material R along the reversing path, at a timing 415 when the leading end of the recording material R reaches the registration sensor 222 (410). The sheet feeding/conveyance controller 330 starts the conveying speed control (acceleration and deceleration) again (416). The sheet feeding/conveyance controller 330 calculates a preceding amount S2(446) of the recording material R similarly as in the conveying speed control for the image on the first surface (side). The sheet feeding/conveyance controller 330 calculates a speed V2(443) for delaying the conveyance of the recording material R and a timing (447) when the speed V2 is returned to the transfer execution speed V0(441). The sheet feeding/conveyance controller 330 executes the conveying speed control, and thus causes the leading end of the recording material R and the leading end of the image to coincide with each other. Incidentally, the recording material R precedes the image, and therefore, the speed V2 is a speed slower than the transfer execution speed V1(V2<V0). The sheet feeding/conveyance controller 330 then waits for sheet feeding of a subsequent recording material R (417). In the above-described description, as an example, the conveying speed control in which the recording material R precedes the image (400) and in which the recording material R is delayed was described, but in the case where the image precedes the recording material R, conveying speed control in which the conveyance of the recording material R is made early is executed. That is, the sheet feeding/conveyance controller 330 calculates a speed faster than the transfer execution speed V0 and a timing when the speed is returned to the transfer execution speed V0.

(Conveyance Speed Control: Once Stop)

Next, using a timing chart of FIG. 4, the case where drive of the motor is once stopped in the case where the long paper is conveyed and thus the leading end of the recording material R and the image leading end are caused to coincide with each other will be described. Control and a basic control operation for the first surface (front surface) are the same as those in the case of FIG. 3, and therefore, in this case, a portion different from the case of FIG. 3 will be described.

In the case where due to a delay of the print start command 406 from the controller 301, or the like, the image formation is started (405) later than that in FIG. 3 by a time corresponding to a time 407, the recording material R precedes the image by a lapse of the time 407. In such a case, when the conveying speed control is executed, even at a minimum speed capable of being controlled by the motor, precedence of the recording material R cannot be completed eliminated in some instances. For this reason, only by the acceleration and the deceleration of the motor, the precedence of the recording material R cannot be eliminated.

In that case, the sheet feeding/conveyance controller 330 needs to perform the following operation. That is, at a timing (415) when the registration sensor 222 detects the leading end of the recording material R, the drive of the motor is once stopped and the conveyance of the recording material R is stopped in order to match timings of the leading end of the recording material R and the image leading end. Then, by advancing only the conveyance of the image leading end, the precedence of the recording material R is eliminated.

At a timing when the leading end of the image reaches a re-feeding position 418, the motor is driven again, and thus the recording material is caused to enter the secondary transfer portion.

Here, the fixing motor 352 is also a driving source of the fixing device 214. The fixing motor 352 needs to continue the drive of the fixing device 214 in order to enhance a temperature necessary for the image form operation. If the fixing motor 352 is drive-stopped and then is driven again, it takes a certain time until the temperature necessary for the fixing operation is ensured.

As described above, the registration sensor 222 is disposed immediately before the secondary transfer position, and therefore, a distance between the registration sensor 222 and the fixing device 214 is short. When the drive of the fixing motor 352 is stopped in a state in which the leading end of the recording material R reaches the registration sensor 222, the recording material R reaches the fixing device 214 in some cases before the temperature necessary for the fixing operation is ensured when the fixing motor 352 is driven again. Accordingly, at a point of time when the leading end of the recording material R reaches the registration sensor 222, the drive of the fixing motor 352 is continued. Further, in this embodiment, in the case where the fixing motor 352 is driven, the reversing roller pair 230 is constituted so as to be always driven in interrelation with the fixing motor 352.

Figure 6:
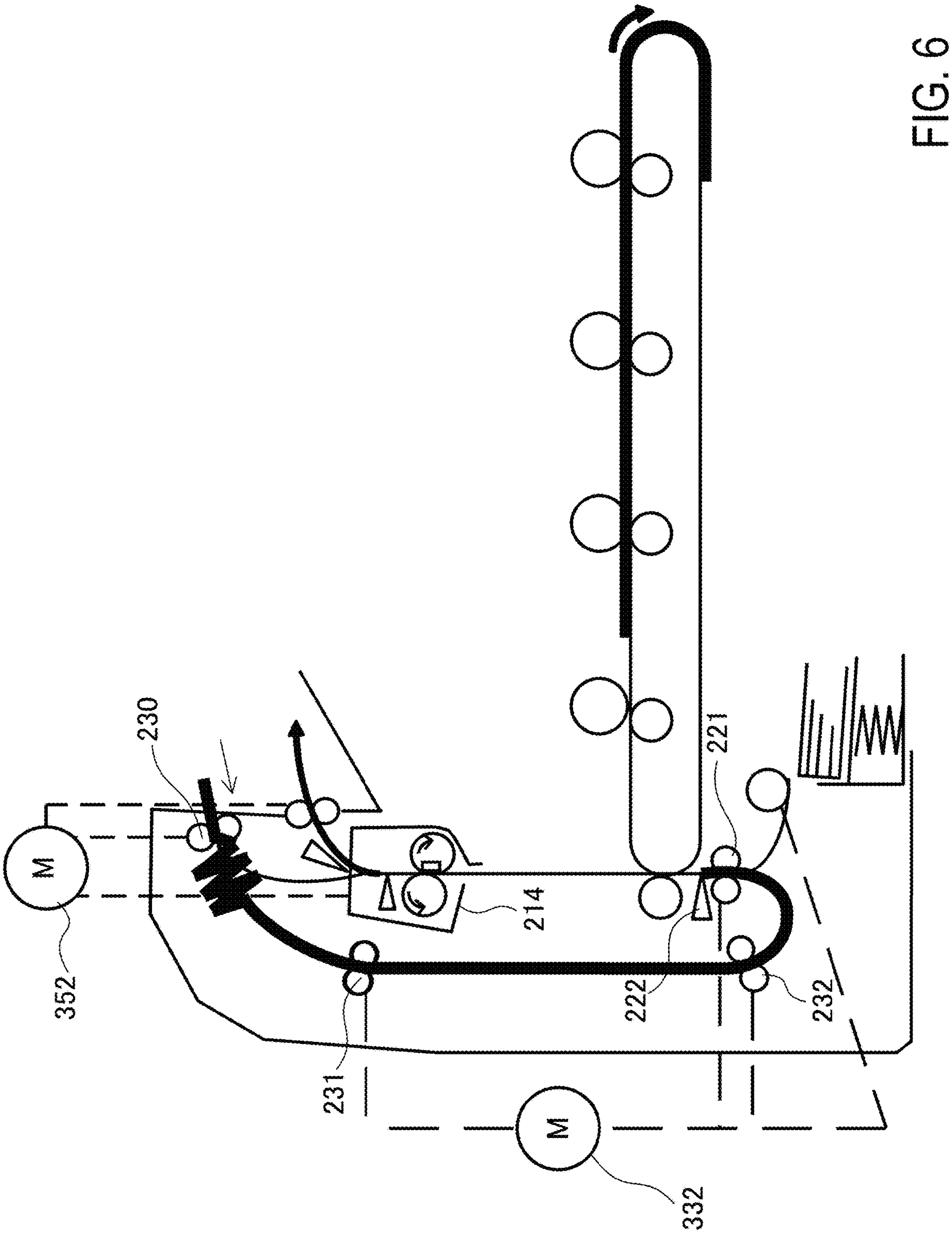
FIG. 6 is a schematic sectional view in the case where once stop of a motor during the double-side printing of the long paper is executed in the reference embodiment 1.

In the case where the precedence of the recording material R is eliminated by once stopping the recording material R, when the long paper is used as the recording material R, the following problem arises. As shown in FIG. 6, when the sheet feeding motor 332 is drive-stopped, of the rollers nipping the recording material R, the registration roller 221 and the conveying roller pairs 231 and 232 are rotation-stopped. On the other hand, the fixing motor 352 cannot be drive-stopped, and the reversing roller pair 230 continuously conveys the recording material R toward an inside of the image forming apparatus, so that a shape of the recording material R becomes a bellow shape (accordion shape), and thus the recording material R is broken.

(Control of Reference Embodiment 1)

In the reference embodiment 1, in the case of an example of FIG. 6, at a timing when the reversing solenoid 345 is drive-stopped, a recording material conveying speed from the reversing path to the registration sensor 222 and a timing when the speed is returned to a speed before a change are determined. As a result, in the conveying speed control in the case where the leading end of the recording material R is detected by the registration sensor 222, the preceding amount of the recording material R is decreased to an amount in which the recording material preceding amount can be eliminated by acceleration and deceleration of the motor, so that the conveyance of the recording material R can be continued without drive-stopping the sheet feeding motor 332 and the fixing motor 352.

That is, according to the control of the reference embodiment 1, when the above-described first control is executed after the leading end of the recording material R as the long paper subjected to the double-side printing reaches the registration sensor 222, acceleration and deceleration of the conveying speed of the recording material R are executed, while the recording material R is not stopped. That is, the conveyance of the recording material R is continued.

In the reference embodiment 1, in the case where the recording material R is a predetermined recording material having a length such that the recording material R is conveyed also by the registration roller 221 in a state in which the trailing end of the recording material R does not pass through the reversing roller pair 230, the following control is carried out. This control is executed in the case where the predetermined recording material is actually conveyed by the reversing roller pair 230 and the registration roller 221 (i.e., when the double-side printing is performed). The sheet feeding/conveyance controller 330 executes second control (S3 described later), before the above-described first control, in which the conveying speed of the predetermined recording material is decelerated on a side upstream of the registration sensor 222 with respect to the conveying direction or the conveyance of the predetermined recording material is stopped. As an example of the predetermined recording material, in the reference embodiment 1, the long paper is used. Incidentally, the predetermined recording material can also be said as a recording material having a length in which the leading end of the recording material is capable of reaching the registration roller 221 in a state in which the trailing end of the recording material does not reach the reversing roller pair 230.

Figure 7:
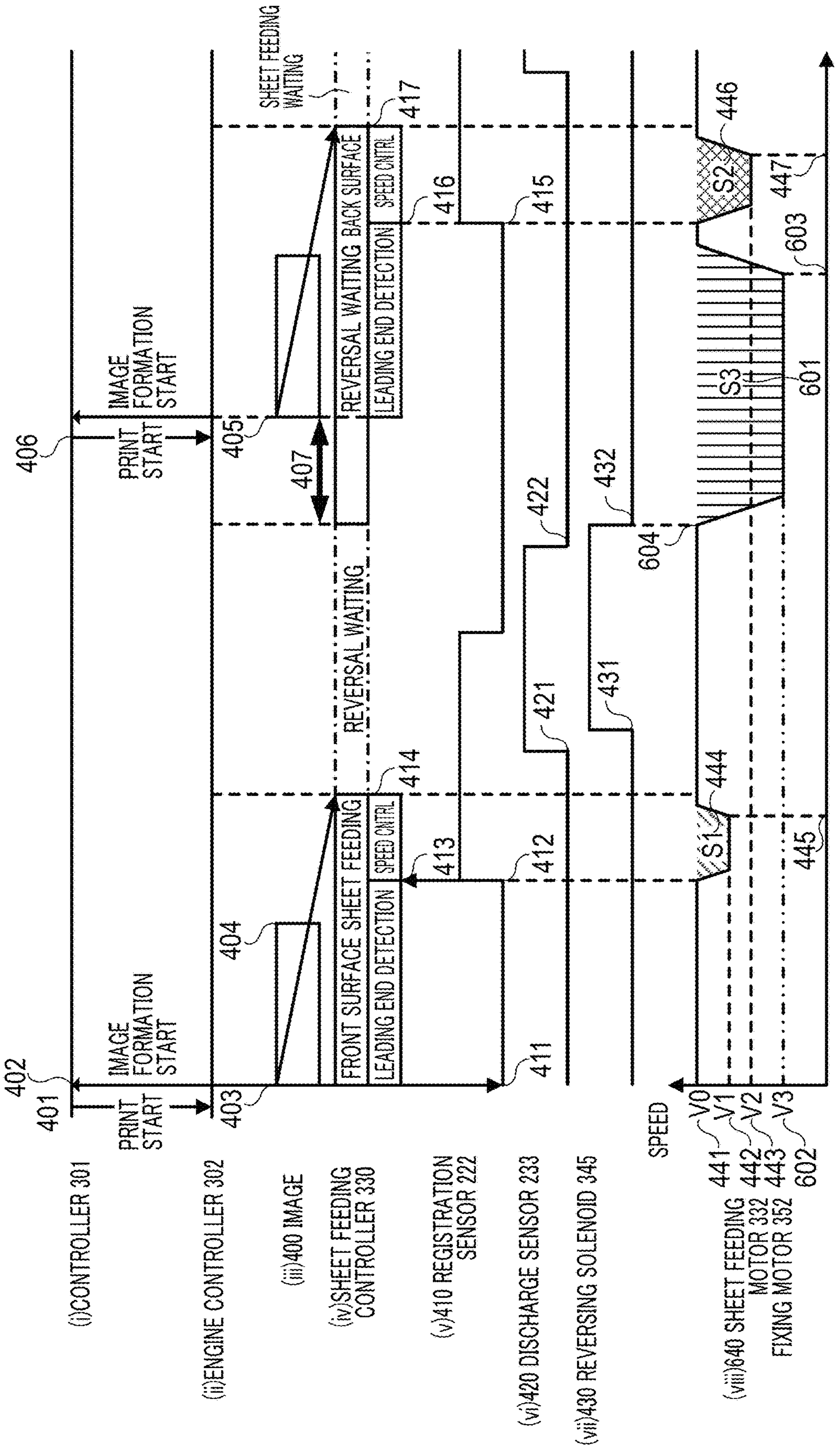
FIG. 7 is a timing chart showing another conveying speed control during the double-side printing of the long paper in the reference embodiment 1.

FIG. 7 is a timing chart in the case where the control of the reference embodiment 1 is applied in the case described with reference to FIG. 4. In FIG. 7, (i) to (vii) are similar to (i) to (vii), respectively, of FIG. 4. In FIG. 7, (viii) shows speeds of the sheet feeding motor 332 and the fixing motor 352. Control and a basic control operation for the first surface (front surface) are the same as those in the cases of FIGS. 3 and 4, and therefore, in this case, a portion different from the cases of FIGS. 3 and 4 will be described.

The reversing solenoid 345 is drive-stopped (432), and at a timing 604 when conveyance of the recording material R in the direction of the registration sensor 222 is started by utilizing the reversing path, the sheet feeding/conveyance controller 330 performs the following calculation. For the image, a predetermined position in front of the secondary transfer position is referred to as a leading end detection corresponding position of the registration sensor 222. A distance between the predetermined position and the secondary transfer position corresponding to a distance from a leading end detection position by the registration sensor 222 to the secondary transfer portion. The sheet feeding/conveyance controller 330 calculates a preceding amount S3(601) of the recording material R relative to the image from a difference between a distance from a position of the leading end of the recording material R to the leading end detection position of the registration sensor 222 and a distance from a position of the leading end of the image to the leading end detection corresponding position of the registration sensor 222. In the following, the position of the leading end of the recording material R is referred to as a sheet leading end position in some cases, and the position of the leading end of the image is referred to as an image leading end position in some cases.

The sheet feeding/conveyance controller 330 calculates the speed V3(602) for delaying the conveyance of the recording material R corresponding to the preceding amount S3(601) and a timing (603) when the speed V3 is returned to the transfer execution speed V0(441) before a change. Incidentally, the recording material R precedes the image, and therefore, the speed V3 is a speed slower than the transfer execution speed V1(V3<V0). Further, in (viii) of FIG. 7, V3<V2 holds, but depending on a condition, the V3 does not always satisfy V3<V2.

At this time, the long paper which is the recording material R is nipped by the reversing roller pair 230 driven by the fixing motor 352. For this reason, in addition to the speed of the sheet feeding motor 332, a speed of the fixing motor 352 is also changed to V3(602) and V0(441) (640). Then, the speed of the sheet feeding motor 332 is changed from the transfer execution speed V0(441) to the speed V3(602) (604).

Thereafter, the conveying speed controller 3304 for the sheet feeding motor 332 returns the speed of the sheet feeding motor 332 form the V3(602) to the transfer execution speed V0(441) after a predetermined time has elapsed (603). That is, after the second control is executed and before the first control is executed, the engine controller 302 controls the sheet feeding motor 332 and the fixing motor 352 so that the conveying speed of the recording material R becomes the transfer execution speed V0. By this, the position becomes a position where the image leading end advances than in the case where control for eliminating the preceding amount S3 is not executed, and thus the preceding amount of the recording material R becomes small, so that when the conveying speed control is executed, it is possible to select the acceleration and the deceleration of the conveying speed, not the once stop of the drive of the motor. Thereafter, at a timing (415) when the leading end of the recording material R reaches the registration sensor 222, the conveying speed control (first control) (FIG. 3) in which the acceleration and the deceleration of the motor are performed is executed as described with reference to FIGS. 3 and 4, so that the leading end of the recording material R and the image leading end are caused to coincide with each other.

Incidentally, an operation in which the recording material R is conveyed at the speed V3 is basically performed when the recording material R precedes the image. Accordingly, in many cases, the speed V2 of the sheet feeding motor 332 after the recording material R reaches the registration sensor 222 is a speed slower than the transfer execution speed V0. However, as a result that arrival of the recording material R at the registration sensor 222 is delayed, the image precedes the recording material R in some instances. In this case, the speed V2 of the sheet feeding motor 332 after the recording material R reaches the registration sensor 222 is a speed faster than the transfer execution speed V0.

Further, the recording material R is not the long paper, in a state in which the leading end of the recording material R is contacted to the registration sensor 222, the trailing end of the recording material P is separated from the reversing roller pair 230. In this case, in a state in which the leading end of the recording material R reaches the registration sensor 222, even when the sheet feeding motor 332 is stopped and the fixing motor 352 is driven, breaking of the recording material R does not occur. Accordingly, in the case where the recording material R is not the long paper, there is no need to execute the above-described control.

In the image forming apparatus 200 in this embodiment, the first conveying means driven by the sheet feeding motor 332 includes a plurality of first rollers (the registration roller 221), the conveying roller pair 231, the conveying roller of the conveying roller pair 231). Of these rollers, the conveying roller of the conveying roller pair 231 is one of the plurality of first rollers, and is disposed adjacent to the reversing roller of the reversing roller pair 230.

The reversing roller pair 230 conveys the recording material R so that a pair of the recording material R projects to an outside of a casing of the image forming apparatus 200. Further, when the double-side printing in which the conveying direction of the recording material R passed through the fixing device 214 is reversed is performed, the reversing roller pair 230 is disposed in a position remotest from the registration sensor 222 with respect to the reversed conveying direction.

As a result thereof, when the leading end of the recording material R reaches the registration sensor 222, in the case where a recording material R having a length such that the recording material R is separated from the reversing roller pair 230 is used, in the first control, stop of the conveyance is allowed.

(Conveying Speed Control of Reference Embodiment 1)

Figure 8:
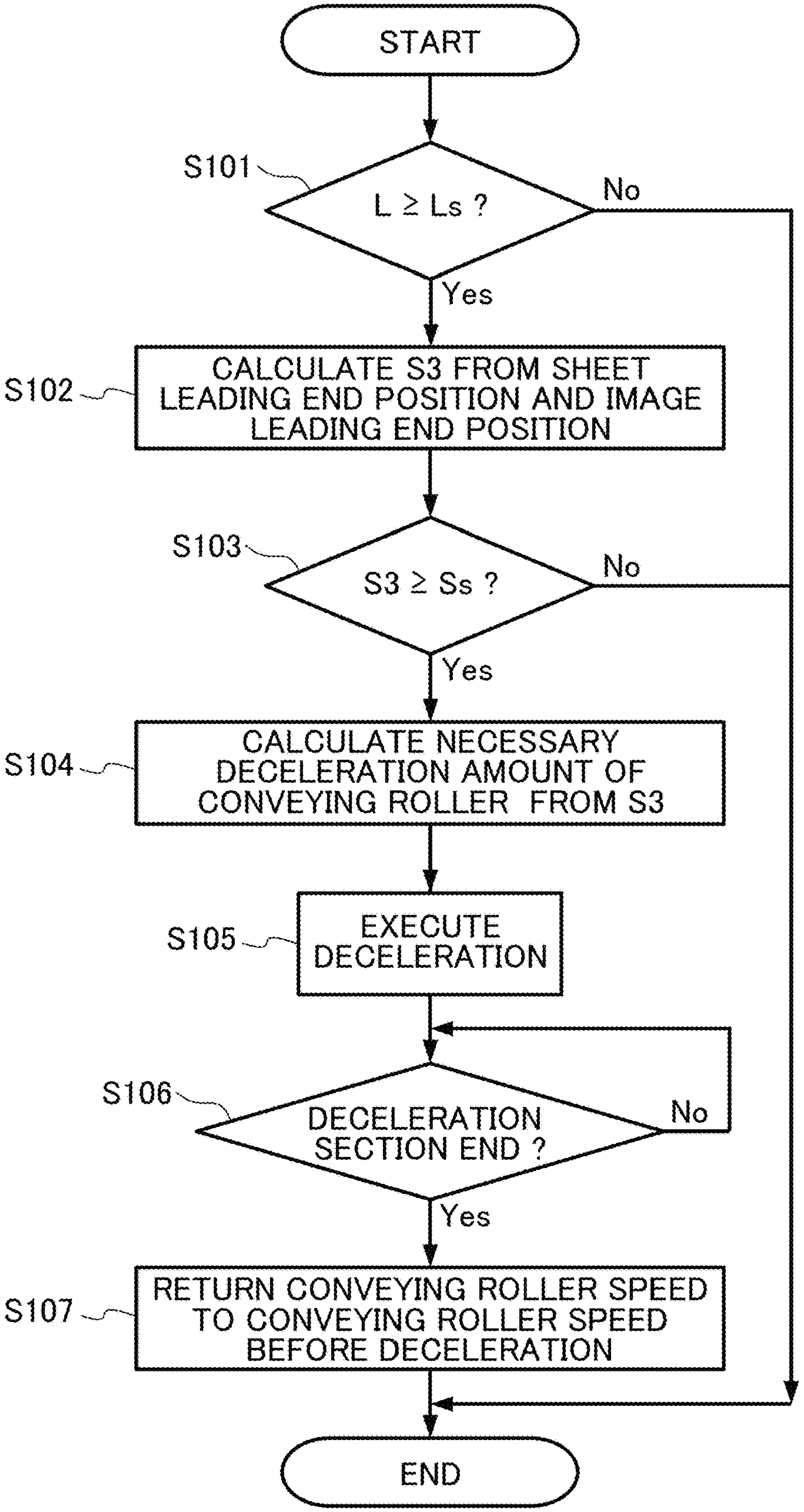
FIG. 8 is a flowchart showing the conveying speed control during a reversing operation of the long paper in the reference embodiment 1.

Next, of the control described with reference to FIG. 7, control from a start of conveyance of the recording material R toward the reversing path after stopping the drive of the reversing solenoid 345(604) until the conveying speed control (415) is started will be described using FIG. 8.

In a step (hereinafter, referred to as "S") 101, the sheet feeding/conveyance controller 330 discriminates whether or not the length L of the recording material R is not less than a threshold Ls of the length of the recording material R. In the case where the sheet feeding/conveyance controller 330 discriminated in S101 that the length L of the recording material R actually conveyed is less than the length threshold Ls of the recording material R, the sheet feeding/conveyance controller 330 ends processing. In this case, when the leading end of the recording material R reached the leading end detection position of the registration sensor 222, the recording material R is not nipped between the reversing roller pair 230 operated by the fixing motor 352. For that reason, the conveying operation in which the speed is decelerated is not performed, and the conveyance is continued at a speed as it is. On the other hand, the sheet feeding/conveyance controller 330 discriminated in S101 that the length L of the recording material R is not less than the threshold Ls, the sheet feeding/conveyance controller 330 causes the processing to go to S102. In this case, when the leading end of the recording material R reaches the leading end detection position of the registration sensor 222, the recording material R is nipped by the reversing roller pair 230 operated by the fixing motor 352.

In S102, the sheet feeding/conveyance controller 330 acquires a time until the recording material R reaches from a leading end position of the present sheet to the leading end detection position of the registration sensor 222 and a time until the image reaches from a leading end position of the present image to the leading end detection corresponding position of the registration sensor 222. The sheet feeding/conveyance controller 330 acquires a difference between these times end calculates the preceding amount S3 of the recording material R relative to the image.

In S103, the sheet feeding/conveyance controller 330 discriminates whether or not the preceding amount S3 acquired in S102 is not less than an upper-limit preceding amount threshold Ss. Here, the upper-limit preceding amount threshold Ss is a preceding amount which can be eliminated in the case where when the speed of the motor is accelerated and decelerated in the conveying speed control, the motor is driven at a slowest controllable speed and a driving state of the motor is returned at a latest conveying.

As described with reference to FIG. 6, in the case where the preceding amount of the recording material R is large at the timing when the leading end of the recording material R reaches the position of the registration sensor 222 and the precedence of the recording material R cannot be eliminated even when the acceleration and the deceleration of the speed of the motor are executed, conveying speed control of the once stop or the deceleration is executed.

In the case where the sheet feeding/conveyance controller 330 discriminated in S103 that the preceding amount S3 is smaller than the preceding amount threshold Ss, the decelerated conveying operation is not performed, and the conveyance is continued at a speed as is, and then the sheet feeding/conveyance controller 330 ends the processing. On the other hand, in the case where the sheet feeding/conveyance controller 330 discriminated in S103 that the preceding amount S3 is not less than the preceding amount threshold Ss, the sheet feeding/conveyance controller 330 causes the processing to go to S104. In this case, the conveying speed of the recording material R is decelerated and the conveying operation is performed.

In S104, the sheet feeding/conveyance controller 330 calculates a necessary deceleration amount of the conveying roller from the preceding amount S3 of the recording material R. As described with reference to FIG. 7, the sheet feeding/conveyance controller 330 calculates the speed V3 for delaying the recording material R and the timing (603) of returning the speed V3 to the transfer execution speed V0 from the preceding amount S3 of the recording material R relative to the image. In S105, the sheet feeding/conveyance controller 330 executes the deceleration of the sheet feeding motor 332 and the fixing motor 352. Incidentally, control of the fixing motor 352 is executed by the fixing conveyance controller 350, and the same applies to the following reference embodiment and embodiments. As described with reference to FIG. 7, the sheet feeding/conveyance controller 330 changes the speeds of the sheet feeding motor 332 and the fixing motor 352 to a speed for delaying the recording material R, for example, the speed V3.

In S106, the sheet feeding/conveyance controller 330 discriminates whether or not a deceleration section is ended, and in the case where the sheet feeding/conveyance controller 330 discriminated that the deceleration section is not ended, the sheet feeding/conveyance controller 330 returns the processing to S106. In the case where the sheet feeding/conveyance controller 330 discriminated that the deceleration section is ended, the sheet feeding/conveyance controller 330 causes the processing to go to S107. That is, in this discrimination, the sheet feeding/conveyance controller 330 checks a timing (603) when the speed is returned from the speed 13, acquired in S104, for delaying the recording material R to the original transfer execution speed V0. The deceleration section is a section from 604 to 603 in (viii) of FIG. 7. In S107, the sheet feeding/conveyance controller 330 returns the speeds of the sheet feeding motor 332 and the fixing motor 352 to the transfer execution speed V0 before the processing of S105 is executed, and then ends the processing.

As described above, the speed of the motor from a reversal start position of the recording material to the leading end detection position of the registration sensor 222 and the timing when the speed of the motor is returned are determined, and the recording material is conveyed along the reversing path. By this, the precedence of the recording material R at the timing when the leading end of the recording material R is detected by the registration sensor 222 is eliminated, so that the leading end of the recording material R and the leading end of the image can be caused to coincide with each other by using the acceleration and the deceleration of the motor in the conveying speed control, in other words, without once stopping the drive of the motor. Further, in the case where the recording material R is not the long paper, control such that the recording material R is once stopped on a side downstream of the registration sensor 222 may be executed.

Incidentally, the reference embodiment 1 does not limit the invention according to the appended claims, and in addition, all the features described in the reference embodiment 1 are not essential to solution of the invention.

Thus, the sheet feeding/conveyance controller 330 acquires a preceding distance in which the predetermined recording material precedes the toner image on the basis of a difference between a first time and a second time at a point of time (405 of FIG. 4) when formation of the toner image by each of the cartridges is started. Here, the first time is a time until the leading end of the recording material R is detected by the registration sensor 222. The second time is a time until the image reaches a predetermined position (the leading end detection corresponding position of the registration sensor 222) on a side upstream of the secondary transfer position with respect to a movement direction of the intermediary transfer belt 213. A distance between the predetermined position and the secondary transfer position corresponding to a distance from the registration sensor 222 to the secondary transfer position. The sheet feeding/conveyance controller 330 acquires, on the basis of the acquired preceding distance, a first speed (V3) of the sheet feeding motor 332 and the fixing motor 352 in the above-described second control and a timing (603) when the speed is returned to a second speed (transfer execution speed V0) before the second control is executed.

As described above, according to the reference embodiment 1, in the image forming apparatus in which conveyance of the recording material R is performed by the plurality of driving sources, the image formation can be normally carried out without influencing the recording material.

Reference Embodiment 2

In the reference embodiment 1, in the case where the start of the image formation for the second surface (back surface) is delayed, the conveying speed from the reversing path to the registration sensor 222 and the timing when the conveying speed is returned to the conveying speed before the change was determined and thus control was carried out.

By this, the method in which the acceleration and the deceleration of the sheet feeding motor 332 and the fixing motor 352 are executed in the conveying speed control in the case where the leading end of the recording material R is detected by the registration sensor 222 was described.

However, when the start of the image formation is further delayed, the following case arises. Even in the case where the conveyance control is executed in which the conveying speed is lowered to a lower limit in the control of the reference embodiment 1, when the leading end of the recording material R is detected by the registration sensor 222, the precedence of a sheet leading end position relative to an image leading end position cannot be eliminated, and therefore, once stop is selected in the conveying speed control in some instances.

Further, when the drive of the fixing motor 352 which is the driving source for the reversing roller pair 230 is stopped, there is a need to stop also fixing temperature control in combination therewith. For this reason, when the drive of the fixing motor 352 is stopped by selecting the once stop in the above-described conveying speed control, the fixing temperature control is also stopped similarly. That is, a heating operation by a heater 226 of the fixing device 214 is stopped. As a result, the temperature of the fixing device 214 lowers. Thereafter, in the case where temperature control is resumed by driving the fixing motor 352 again, when a distance from the leading end detection position of the recording material R by the registration sensor 222 to entrance of the recording material R into the fixing device 214 is short, only a time in which the recording material R is conveyed in a distance corresponding to the above-described distance can only be ensured as a time for executing the temperature control. That is, the recording material R reaches the fixing device 214 before the temperature of the fixing device 214 reaches a fixable temperature, and therefore, there is a liability that the toner image cannot be appropriately fixed on the recording material R.

Therefore, in view of such a situation, in the reference embodiment 2, conveyance of the recording material R is stopped when the leading end of the recording material R reaches an arbitrary position on a side upstream of the registration sensor 222 with respect to the conveying direction, so that the precedence of the sheet leading end position relative to the image leading end position is eliminated, and then the recording material R is conveyed again to the registration sensor 222. At this time, the position where the recording material R is stopped is determined so that the temperature of the fixing device 214 is capable of reaching the fixable temperature until the recording material R reaches the fixing device 214 after the conveyance of the recording material R is resumed.

When the control of the reference embodiment 2 is executed, at the timing when the leading end is detected by the registration sensor 222, the precedence of the recording material R is eliminated, and therefore, the sheet leading end position and the image leading end position can be caused to coincide with each other by using the acceleration and the deceleration of the sheet feeding motor 332 in the conveying speed control.

That is, in the reference embodiment 2, in the second control described in the reference embodiment 1, in the case where the recording material R precedes the toner image even when the first speed is a slowest speed of the speeds of the sheet feeding motor 332 and the fixing motor 352, the sheet feeding/conveyance controller 330 executes the following control. The sheet feeding/conveyance controller 330 executes third control described later in which conveyance of the recording material R is stopped before the leading end of the recording material R reaches the registration sensor 222 (hereinafter, this control is referred to as once-stop control of fixing drive).

(Control in Case Where Fixing Drive is Once Stopped)

Figure 9:
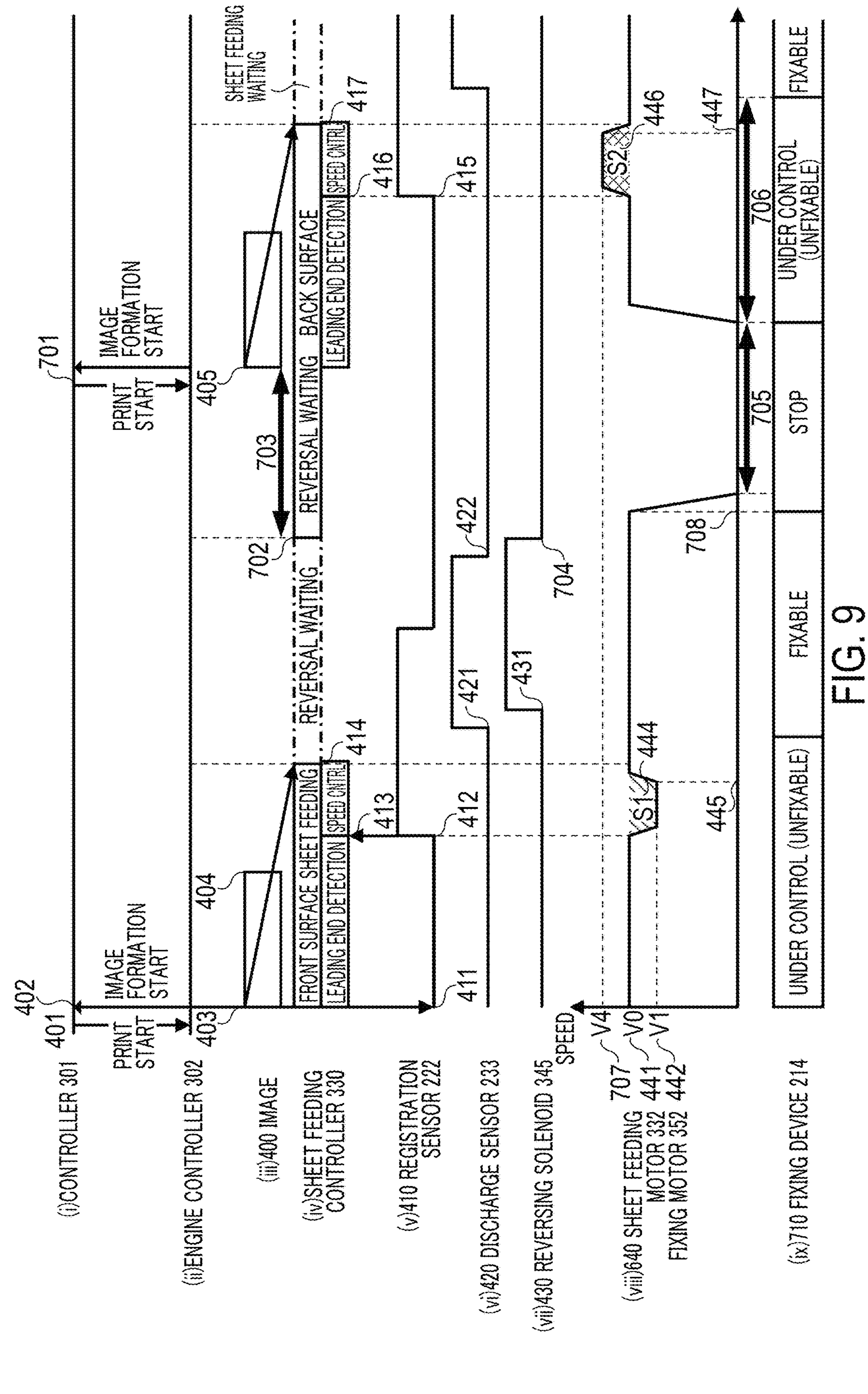
FIG. 9 is a timing chart showing conveying speed control during double-side printing of long paper in the reference embodiment 2.

FIG. 9 is a timing chart when the control of the reference embodiment 2 is applied in the case where the image formation start is further delayed than the situation assumed in the reference embodiment 1. In FIG. 9, (i) to (viii) are schematic views similar to the schematic views shown by (i) to (viii), respectively, of FIG. 7. In FIG. 9, (ix) shows a state 710 (under control (unfixable), fixable, stop, etc.). A basic control operation is the same as the basic control operation in the reference embodiment 1 described with reference to FIG. 7, and therefore, the same events are represented by the same reference numerals or symbols, and in this reference embodiment 2, a difference from FIG. 7 will be described.

In the case where a start of formation of the image on the back surface of the recording material R is delayed (405) due to a delay of the print start command 701 from the controller 301, or the like, at the timing (704) when the conveyance of the recording material R toward the reversing path is started, the image leading end position and the sheet leading end position are compared with each other, so that the preceding amount is determined. Here, a difference between the timing 702 of the image formation start when the preceding amount becomes 0 and the timing (405) when the image formation is actually started is calculated, so that the image formation delay time 703 is determined. In order to eliminate the precedence of the recording material R generated due to the delay of the start of the image formation and corresponding to the image formation delay time 703, a conveyance stop time 705 corresponding to the same time as the image formation delay time 703 is determined.

Next, depending on a stop of drive of also the fixing motor 352, the temperature of the fixing device 214 lowered in the case where the temperature control of the fixing device 214 is stopped in a time corresponding to the conveyance stop time 705 is calculated. A time 706 from the temperature control is resumed during re-drive of the fixing device 214 (fixing motor 352) until the temperature reaches a toner fixable temperature is determined. Incidentally, an amount (lowering amount) in which the temperature of the fixing device 214 lowers in a period from the stop of the temperature control to the re-drive of the fixing device 214, and the time 706 from the resumption of the temperature control until the toner becomes fixable is not necessarily required to be a value acquired by being calculated by the engine controller 302. For example, a value determined in advance by an experiment or the like is stored in a storing portion included in the engine controller 302, and the engine controller 302 uses the value stored in the storing portion.

Thereafter, in order to ensure the time in which the recording material R enters the fixing device 214 by a time corresponding to the above-described time 706, the following control is carried out. Here, the conveyance of the recording material R to the fixing device 214 is performed at the transfer execution speed V0(441), and during the conveying speed control, the conveyance of the recording material R is performed at a maximum speed V4(V4<V0) (707) of the sheet feeding motor 332 and the fixing motor 352. In this case, a timing on a side upstream of the fixing device 214 by a distance corresponding to a distance in which the recording material R is conveyed during the time 706 (hereinafter, this timing is referred to as a conveyance stop timing 708) is determined. Incidentally, in an example shown in FIG. 9, in the conveying speed control, the recording material R is conveyed at the maximum speed V4 faster than the transfer execution speed V0, in other words, the conveyance of the recording material R is accelerated, but the present invention is not limited thereto. In the conveying speed control, as shown in 446 of (viii) of FIG. 7 in the reference embodiment 1, the case where the conveyance of the recording material R is decelerated may be present.

The conveyance of the recording material R toward the reversing path is performed at the transfer execution speed V0, and at the timing when the leading end of the recording material R reaches the conveyance stop timing 708, drive of the fixing motor 352 and the sheet feeding motor 332 is stopped, and the controller waits for a lapse of the conveyance stop time 705. When the conveyance stop time 705 has elapsed, the fixing motor 352 and the sheet feeding motor 332 are re-driven, and the conveyance of the recording material R is resumed at the transfer execution speed V0 and is performed until the leading end of the recording material R is detected by the registration sensor 222.

At the timing (415) when the leading end of the recording material R is detected by the registration sensor 222, the precedence of the recording material R is eliminated by the control in which the recording material R is stopped on the side upstream of the registration sensor 222 with respect to the conveying direction. For this reason, when the conveying speed control (first control) described with reference to FIG. 3 is carried out, the sheet leading end position and the image leading end position can be caused to coincide with each other without once stopping the conveyance of the recording material R, in other words, drive of the sheet feeding motor 332 and the fixing motor 352.

(Conveying Speed Control in Case Where Fixing Drive is Once Stopped)

Figure 10:
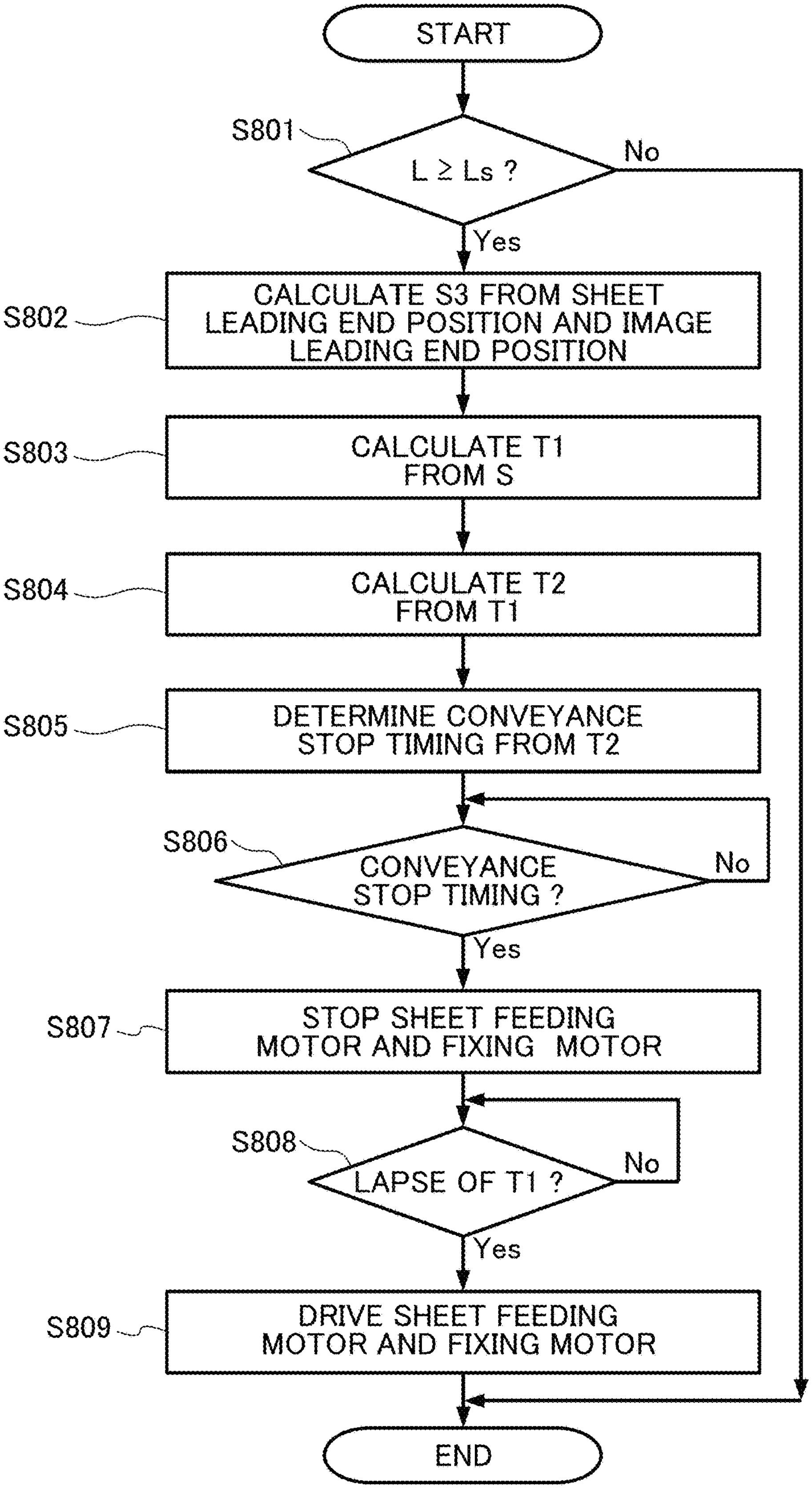
FIG. 10 is a flowchart showing the conveying speed control during the double-side printing of the long paper in the reference embodiment 2.

Using FIG. 10, once-stop control of the fixing drive, described with reference to FIG. 9, in the case where the precedence of the recording material R is eliminated by once stopping the fixing drive in a period from the start of the conveyance of the recording material R to the reversing path until the conveying speed control is started will be described. In S801, the sheet feeding/conveyance controller 330 discriminates whether or not the length L of the recording material R is the threshold Ls or more, on the basis of information acquired from the controller 301 or the operation display portion 251. In the case where the sheet feeding/conveyance controller 330 discriminated in S801 that the length L of the recording material R is shorter than the threshold Ls, the sheet feeding/conveyance controller 330 ends the processing without executing the once-stop control of the fixing drive. In the case where the sheet feeding/conveyance controller 330 discriminated in S801 that the length L of the recording material R is the threshold Ls or more, the sheet feeding/conveyance controller 330 causes the processing to go to S802 in order to execute the once-stop control of the fixing drive.

In S802, the sheet feeding/conveyance controller 330 acquires a time required for conveying the recording material R from the leading end position of the present sheet to the secondary transfer position at the transfer execution speed V0 and a time required for conveying the toner image on the intermediary transfer belt 213 from the leading end position of the present image to the secondary transfer position. The sheet feeding/conveyance controller 330 calculates the preceding amount S of the recording material R relative to the image by calculating the difference between the acquired two times. Incidentally, in the case where the start of the image formation, the leading end position of the image cannot be determined, and therefore, the sheet feeding/conveyance controller 330 carries out subsequent image formation from a present point of time and acquires a time until the secondary transfer of the image is performed, and then calculates the preceding amount S.

In S803, the sheet feeding/conveyance controller 330 calculates the above-described conveyance stop time T1 (705 of (ix) of FIG. 9) in order to eliminate the preceding amount S acquired in S802. In S804, the sheet feeding/conveyance controller 330 calculates an amount such that the temperature of the fixing device 214 lowered due to a lapse of the conveyance stop time T1(705) in which the fixing roller 223 is rotation-stopped and the temperature control is also stopped. The sheet feeding/conveyance controller 330 calculates the time T2 (the above-described time 706) (time from the fixing re-drive to fixable state) required for recovering an amount corresponding to the lowered temperature.

In S805, the sheet feeding/conveyance controller 330 calculates a distance D in which the recording material R is conveyed at the transfer execution speed V0 in the case where the fixing motor 352 is driven correspondingly to the time T2(706) calculated in S804. The sheet feeding/conveyance controller 330 acquires a position upstream by the distance D on the conveying path from the timing when the recording material R enters the fixing device 214, and determines the conveyance stop timing 708 when the recording material R reaches the position upstream by the distance D from the leading end position of the present sheet. At this time, in the case where the time T2 cannot be ensured unless the recording material R stops the position upstream of the leading end position of the present sheet, in the reference embodiment 2, the sheet feeding/conveyance controller 330 discriminates that appropriate toner image fixation by eliminating the precedence of the recording material R cannot be executed. Then, the sheet feeding/conveyance controller 330 notifies the controller 301 of that effect.

In S806, by making reference to a timer, the sheet feeding/conveyance controller 330 discriminates whether or not the time (timing) reaches the conveyance stop timing 708 calculated in S805, and in the case where the sheet feeding/conveyance controller 330 discriminated that the time does not reach the conveyance stop timing 708, the sheet feeding/conveyance controller 330 returns the processing to S806. In the case where the sheet feeding/conveyance controller 330 discriminated in S806 that the time reaches the conveyance stop timing 708, the sheet feeding/conveyance controller 330 causes the processing to go to S807.

In S807, the sheet feeding/conveyance controller 330 stops the drive of the sheet feeding motor 332 and the fixing motor 352 in order to stop the feeding of the recording material R.

In S808, the sheet feeding/conveyance controller 330 discriminates whether or not the conveyance stop time T1 calculated in S803 has elapsed, by making reference to the timer. In the case where the sheet feeding/conveyance controller 330 discriminated in S808 that the conveyance stop time T1 calculated in S803 has not elapsed, the sheet feeding/conveyance controller 330 returns the processing to S808. In the case where the sheet feeding/conveyance controller 330 discriminated in S808 that the conveyance stop time T1 has elapsed, the sheet feeding/conveyance controller 330 causes the processing to go to S809. In S809, the sheet feeding/conveyance controller 330 resumes the drive of the sheet feeding motor 332 and the fixing motor 352 and returns the speed to a speed (for example, the transfer execution speed V0) before the drive the motors is stopped in S807. Incidentally, in the reference embodiments 1 and 2, in the sections in which the conveying speed control (acceleration and deceleration control) is not carried out, the conveyance of the recording material R was performed at the transfer execution speed V0, but the present invention is not limited thereto. The conveying speed of the recording material R in the sections in which the conveying speed control is not carried out may be determined, depending on the image forming condition, between the maximum speed (V4) and the minimum speed of the sheet feeding motor 332 and the fixing motor 352.

As described above, in the reference embodiment 2, the conveyance is stopped so that the recording material leading end stops at an arbitrary side upstream of the registration sensor 222 with respect to the conveying direction, so that the precedence of the recording material R is eliminated, and then the recording material R is conveyed again to the registration sensor 222. By this, the precedence of the recording material R in the timing when the leading end of the recording material R is detected by the registration sensor 222 is eliminated, so that the sheet leading end position and the image leading end position can be caused to coincide with each other.

Incidentally, the reference embodiment 2 does not limit the invention according to the appended claims, and in addition, all the features described in the reference embodiment 2 are not essential to solution of the invention.

Thus, the sheet feeding/conveyance controller 330 acquires a stop time in which conveyance of the predetermined recording material is stopped, on the basis of a difference between a first time and a second time. The first time is a time until the leading end of the recording material R is detected by the registration sensor 222. The second time is a time until the image reaches a predetermined position on a side upstream of the secondary transfer position with respect to a movement direction of the intermediary transfer belt 213. A distance between the predetermined position and the secondary transfer position corresponding to a distance from the registration sensor 222 to the secondary transfer position. The sheet feeding/conveyance controller 330 acquires, on the basis of the acquired stop time, a heater temperature lowered during the stop time, and then acquires, on the basis of the acquired temperature, a restoring time until the temperature is restored to the heater temperature before being lowered. The sheet feeding/conveyance controller 330 determines a timing (708 of FIG. 10) when the drive of the sheet feeding motor 332 and the fixing motor 352 in the above-described third control so that the predetermined recording material reaches the fixing device 214 after the restoring time has elapsed.

As described above, according to the reference embodiment 2, in the image forming apparatus in which conveyance of the recording material R is performed by the plurality of driving sources, the image formation can be normally carried out without influencing the recording material.

Embodiment 1

In the reference embodiments 1 and 2, in the case where the image formation is delayed (407 of FIG. 7, 703 of FIG. 9), conveyance of the recording material R was controlled by determining the conveying speed from the reversing path to the registration sensor 222 and the timing when the conveying speed is returned to the conveying speed before the change. By this, in the conveying speed control in the case where the leading end of the recording material R is detected by the registration sensor 222, the precedence of the recording material R was eliminated by decelerating or stopping the sheet feeding motor 332 and the fixing motor 352. Further, a method in which the preceding amount of the recording material R is decreased to an amount capable of being eliminated by acceleration and deceleration of the motors in the conveying speed control in the case where the recording material leading end is detected by the registration sensor 222 was described.

However, the arises the following problem in the case where the length of the recording material R is longer than the length of the formed image in the conveying direction. That is, correspondingly to a difference between the length of the recording material R and the length of the image, a timing when the reversing solenoid 345 is drive-stopped is delayed. For this reason, the image precedes the recording material R, and as in the control of the reference embodiment 1, the precedence of the image cannot be eliminated by deceleration in speed or stop of the drive of the sheet feeding motor 332 and the fixing motor 352.

Therefore, in view of such a situation, in the embodiment 1, the following control is carried out in the case where it turned out that the image precedes the recording material R at the timing when the reversing solenoid 345 is drive-stopped. Before the above-described first control is carried out, the sheet feeding/conveyance controller 330 accelerates the conveying speed of the predetermined recording material from the transfer execution speed V0 on a side upstream of the registration sensor 222 with respect to the conveying direction.

When the control of the embodiment 1 is carried out, the precedence of the image is eliminated at the timing when the recording material leading end is detected by the registration sensor 222, and therefore, in the conveying speed control, the sheet leading end position and the image leading end position can be caused to coincide with each other by using the acceleration and the deceleration of the sheet feeding motor 332. That is, in the embodiment 1, the sheet feeding/ conveyance controller 330 carries out the following control in the case where the toner image (image) precedes the recording material R. The sheet feeding/conveyance controller 330 determines the conveying speed so as to accelerate the conveying speed of the predetermined recording material before the leading end of the predetermined recording material reaches the registration sensor 222.

(Control of Embodiment 1)

Figure 11:
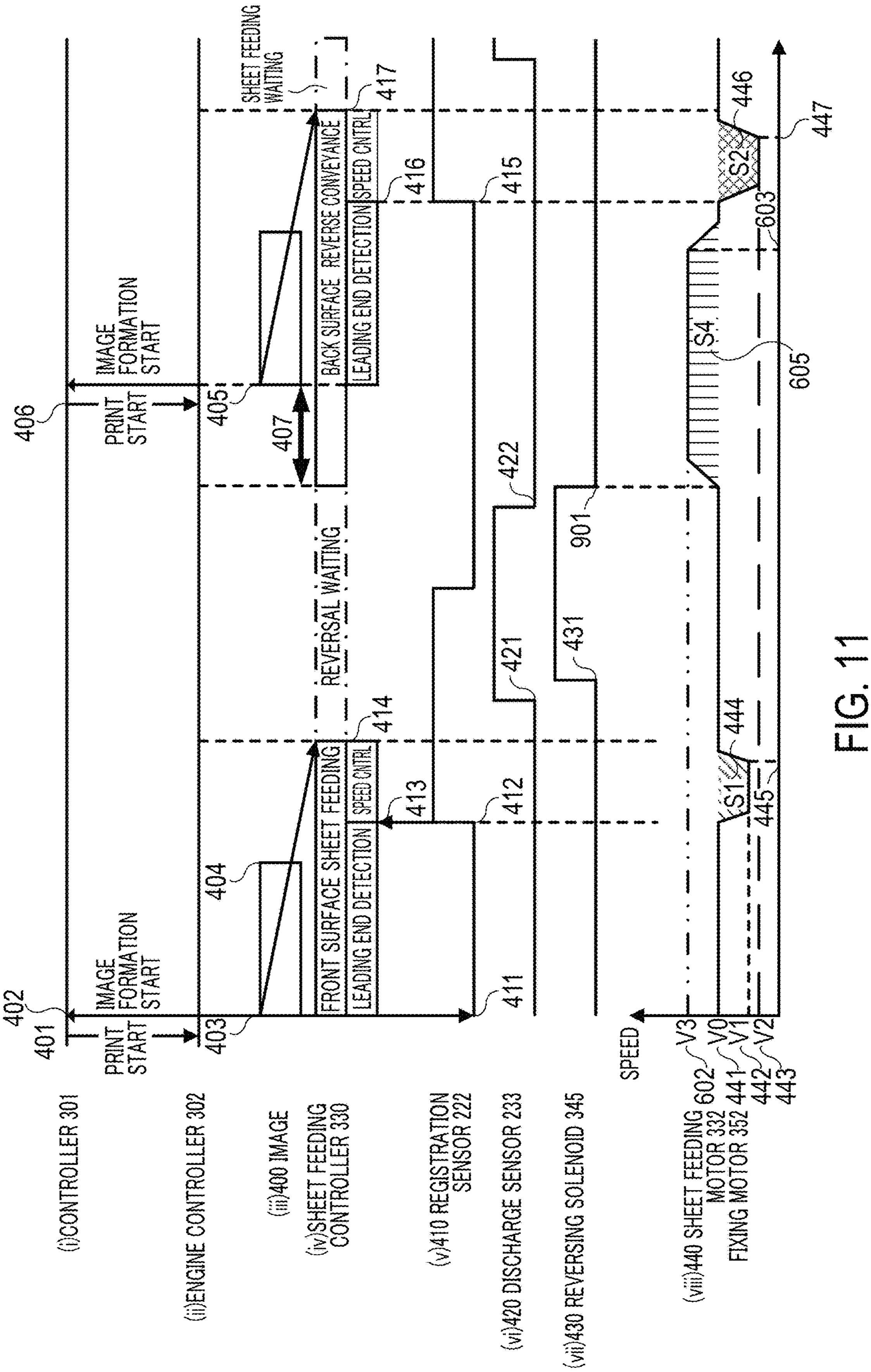
FIG. 11 is a timing chart showing conveying speed control during double-side printing of long paper in the embodiment 1.

FIG. 11 is a timing chart in the case where the control of the embodiment 1 is applied when the image precedes the recording material R. In FIG. 11, (i) to (vii) are schematic views similar to those shown by (i) to (vii), respectively, of FIG. 7. A basic control operation is the same as that in the reference embodiment 1 described with reference to FIG. 7, and therefore, the same events are represented by the same reference numerals or symbols, and in this embodiment, a portion different from the cases of FIG. 7 will be described.

In the case where the image precedes the recording material R due to that the length of the recording material R in the conveying direction is longer than the length of the image, in the conveying direction, designated from the controller 301, the sheet feeding/conveyance controller 330 makes the following determination. That is, the sheet feeding/conveyance controller 330 compares the sheet leading end position and the image leading end position with each other at a timing (901) when conveyance of the recording material R to the reversing path is started, and determines a preceding amount S4(605) of the image relative to the recording material R.

The sheet feeding/conveyance controller 330 calculates the speed V3(602) for making the conveyance of the recording material R early corresponding to the preceding amount S4(605) and a timing (603) when the speed V3 is returned to the transfer execution speed V0(441) before a change. Incidentally, the image precedes the recording material R, and therefore, the speed V3 is a speed slower than the transfer execution speed V1(V3>V0).

The sheet feeding/conveyance controller 330 determines the speed V3 (602) and the timing (603) when the speed is returned to the transfer execution speed V0(441) and then changes the speed of the sheet feeding motor 332 and the fixing motor 352 to the speed V3(602) (901).

Thereafter, the conveying speed controller 3304 for the sheet feeding motor 332 returns the speed of the sheet feeding motor 332 form the V3(602) to the transfer execution speed V0(441) after a predetermined time has elapsed (603). By this, the position becomes a position where the leading end of the recording material R advances than in the case where control for eliminating the image preceding amount S4 is not executed, and thus the preceding amount of the image becomes small, so that when the conveying speed control is executed, it is possible to select the acceleration and the deceleration of the conveying speed, not the once stop of the drive of the motor. Thereafter, at a timing (415) when the leading end of the recording material R reaches the registration sensor 222, the sheet feeding/conveyance controller 330 executes the conveying speed control (first control) in which the acceleration and the deceleration of the motors are performed as described with reference to FIGS. 3 and 4, so that the leading end of the recording material R and the image leading end are caused to coincide with each other.

(Conveying Speed Control Processing in Case of Embodiment 1)

Figure 12:
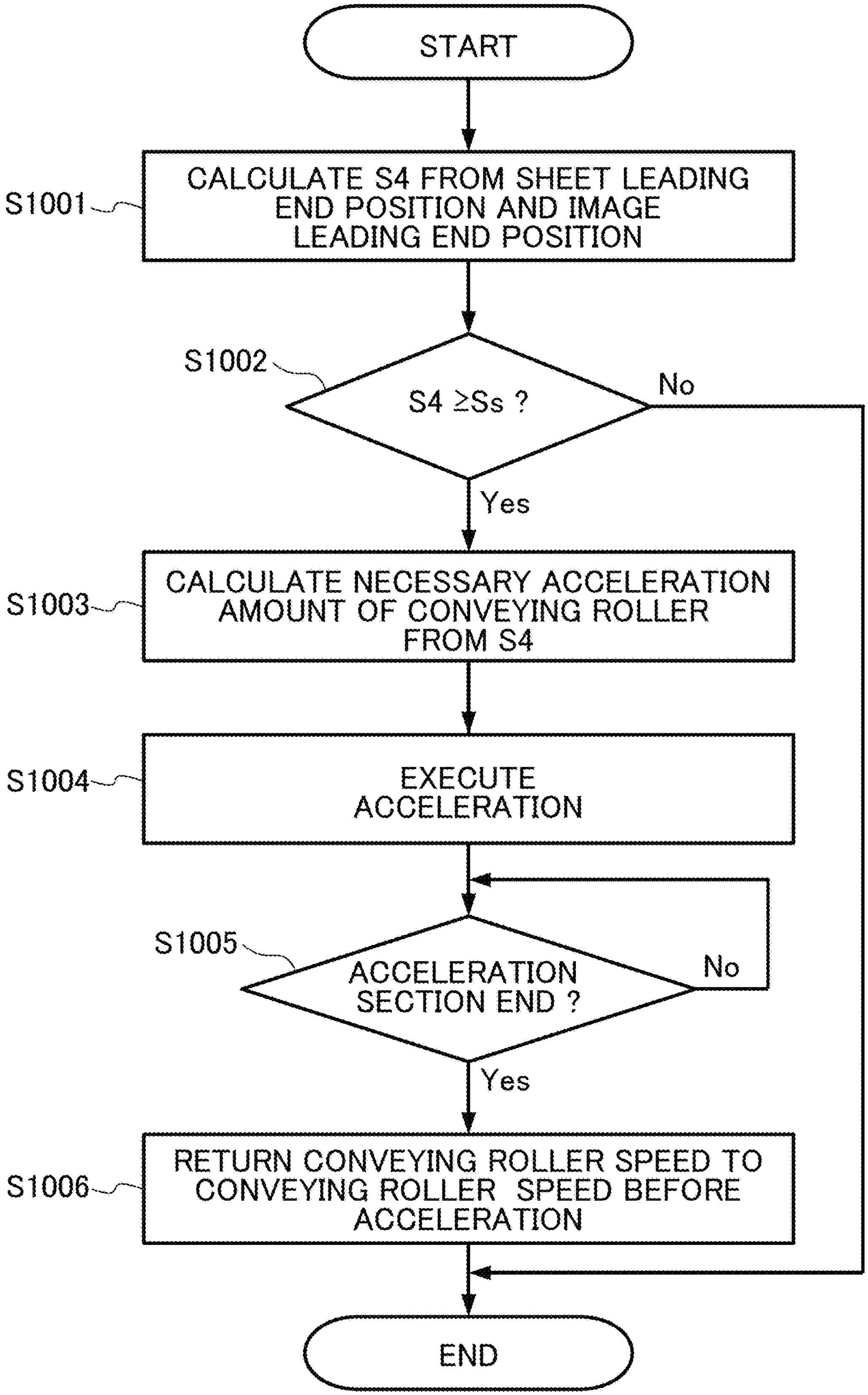
FIG. 12 is a flow chart showing the conveying speed control during the double-side printing of the long paper in the embodiment 1.

Using FIG. 12, control for eliminating the precedence of the image by performing acceleration of the conveying speed of the recording material P in a period from the start of the conveyance of the recording material R to the reversing path until the conveying speed control is started, described with reference to FIG. 11 will be described.

In S1001, the sheet feeding/conveyance controller 330 acquires a time until the recording material R reaches from a leading end position of the present sheet to the leading end detection position of the registration sensor 222 and a time until the image reaches from a leading end position of the present image to the leading end detection corresponding position of the registration sensor 222. The sheet feeding/conveyance controller 330 acquires a difference between these times end calculates the preceding amount S3 of the image relative to the recording material R.

In S1002, the sheet feeding/conveyance controller 330 discriminates whether or not the preceding amount S4 acquired in S1001 is not less than an upper-limit preceding amount threshold Ss. Here, the upper-limit preceding amount threshold Ss is a preceding amount which can be eliminated in the case where when the speed of the motor is accelerated and decelerated in the conveying speed control, the motor is driven at an upper-limit controllable speed and a driving state of the motor is returned at a latest conveying.

In the case where the sheet feeding/conveyance controller 330 discriminated in S1002 that the preceding amount S4 is smaller than the preceding amount threshold Ss, the accelerated conveying operation is not performed, and the conveyance is continued at a speed as it is, and then the sheet feeding/conveyance controller 330 ends the processing. On the other hand, in the case where the sheet feeding/conveyance controller 330 discriminated in S1002 that the preceding amount S4 is not less than the preceding amount threshold Ss, the sheet feeding/conveyance controller 330 causes the processing to go to S1003. In this case, the sheet feeding/conveyance controller 330 accelerates the conveying speed of the recording material R and performs the conveying operation.

In S1003, the sheet feeding/conveyance controller 330 calculates a necessary acceleration amount of the conveying roller from the preceding amount S4 of the recording material R acquired in S1001. As described with reference to FIG. 11, the sheet feeding/conveyance controller 330 calculates the speed V3 for advancing the recording material R and the timing (603) of returning the speed V3 to the transfer execution speed V0 from the preceding amount S4 of the image relative to the recording material R. In S1004, the sheet feeding/conveyance controller 330 executes the acceleration of the sheet feeding motor 332 and the fixing motor 352. As described with reference to FIG. 11, the sheet feeding/conveyance controller 330 changes the speeds of the sheet feeding motor 332 and the fixing motor 352 to a speed for advancing the recording material R, for example, the speed V3.

In S1005, the sheet feeding/conveyance controller 330 discriminates whether or not an acceleration section is ended, and in the case where the sheet feeding/conveyance controller 330 discriminated that the acceleration section is not ended, the sheet feeding/conveyance controller 330 returns the processing to S1005. In the case where the sheet feeding/conveyance controller 330 discriminated that the deceleration section is ended, the sheet feeding/conveyance controller 330 causes the processing to go to S1006. That is, in this discrimination, the sheet feeding/conveyance controller 330 checks a timing (603) when the speed is returned from the speed 13, acquired in S1003, for advancing the recording material R to the original transfer execution speed V0. The acceleration section is a section from 901 to 603 in (viii) of FIG. 11. In S1006, the sheet feeding/conveyance controller 330 returns the speeds of the sheet feeding motor 332 to the transfer execution speed V0 before the processing of S1004 is executed, and then ends the processing.

As described above, in the embodiment 1, the speed of the motor from a reversal start position of the recording material to the leading end detection position of the registration sensor 222 and the timing when the speed of the motor is returned are determined, and the recording material is conveyed along the reversing path. By this, the precedence of the image at the timing when the leading end of the recording material R is detected by the registration sensor 222 is eliminated. After the leading end of the recording material R is detected by the registration sensor 222, the leading end of the recording material R and the leading end of the image can be caused to coincide with each other by using the acceleration and the deceleration (first control) of the motor in the conveying speed control, in other words, without once stopping the drive of the motor.

Further, in the case where the recording material R is not the long paper, control such that the recording material R is once stopped on a side downstream of the registration sensor 222 may be executed. Incidentally, the embodiment 1 does not limit the invention according to the appended claims, and in addition, all the features described in the embodiment 1 are not essential to solution of the invention.

As described above, according to the embodiment 1, in the image forming apparatus in which conveyance of the recording material R is performed by the plurality of driving sources, the image formation can be normally carried out without influencing the recording material.

Embodiment 2

In the reference embodiments 1 and 2 and the embodiment 1, conveyance of the recording material R was controlled by determining the conveying speed from the reversing path to the registration sensor 222 and the timing when the conveying speed is returned to the conveying speed before the change. That is, before the leading end of the recording material R is detected by the registration sensor 222, the sheet feeding motor 332 were decelerated or accelerated. By this, the precedence of the recording material R or the precedence of the image was eliminated, and a method in which the preceding amount of the recording material R or the preceding amount of the image is decreased to an amount capable of being eliminated by acceleration and deceleration of the motors in the conveying speed control (first control) in the case where the leading end of the recording material R is detected by the registration sensor 222 was described.

However, the arises the following problem in the case where the transfer execution speed V0 which is a conveying speed of the recording material R in a section in which the conveying speed control (acceleration and deceleration control) is not carried out is a speed close to the maximum speed V4 of the sheet feeding motor 332 and the fixing motor 352. For example, in the control of the embodiment 1, it is assumed that the conveyance control is carried out by increasing the conveying speed (transfer execution speed V0) to the maximum speed V4. Even in such a case, when the leading end of the recording material R is detected by the registration sensor 222, the precedence of the image leading end position relative to the sheet leading end position cannot be eliminated, and therefore, the leading end of the recording material R and the leading end of the image cannot be caused to coincide with each other in the secondary transfer position in some cases.

Further, in the case where the transfer execution speed V0 which is the conveying speed of the recording material R in the section in which the conveying speed control (acceleration and deceleration control) is not carried out is a speed close to a minimum speed V5 of the sheet feeding motor 332 and the fixing motor 352, the following problem arises. For example, in the control of the reference embodiment 1, it is assumed that the conveyance control is carried out by lowering the conveying speed (transfer execution speed V0) to the minimum speed V5. Even in such case, when the leading end of the recording material R is detected by the registration sensor 222, the precedence of the sheet leading end position relative to the image leading end position cannot be eliminated, and therefore, the once stop is selected in the conveying speed control in some instances.

Therefore, in view of such a situation, in the embodiment 2, the sheet feeding/conveyance controller 330 carries out the following control (fourth control). The sheet feeding/conveyance controller 330 compares a speed difference between the original transfer execution speed V0(441) and the maximum speed V4 of the sheet feeding motor 332 and the fixing motor 352 and a speed difference between the original transfer execution speed V0(441) and the minimum speed V5 of the sheet feeding motor 332 and the fixing motor 352 with each other. As a result of the comparison between the two speed differences, in the case where the transfer execution speed V0 is close to the maximum speed V4, the following change is made. That is, the sheet feeding/conveyance controller 330 changes the image formation start timing so that the conveying speed V3 from the reversing path to the registration sensor 222 can be determined as a conveying speed between the transfer execution speed V0 and the minimum speed V5.

On the other hand, as a result of the comparison between the two speed differences, in the case where the transfer execution speed V0 is closer to the minimum speed V5, the following change is made. That is, the sheet feeding/conveyance controller 330 changes the image formation start timing so that the conveying speed V3 from the reversing path to the registration sensor 222 can be determined as a conveying speed between the transfer execution speed V0 and the maximum speed V4.

By executing the control (fourth control) of the embodiment 2, the conveying speed of the recording material R from the reversing path to the registration sensor 222 can be determined as a speed between the maximum speed V4 and the minimum speed V5 of the sheet feeding motor 332 and the fixing motor 352.

(Case Where Transfer Execution Speed V0 is Close to the Maximum Speed V4)

Figure 13:
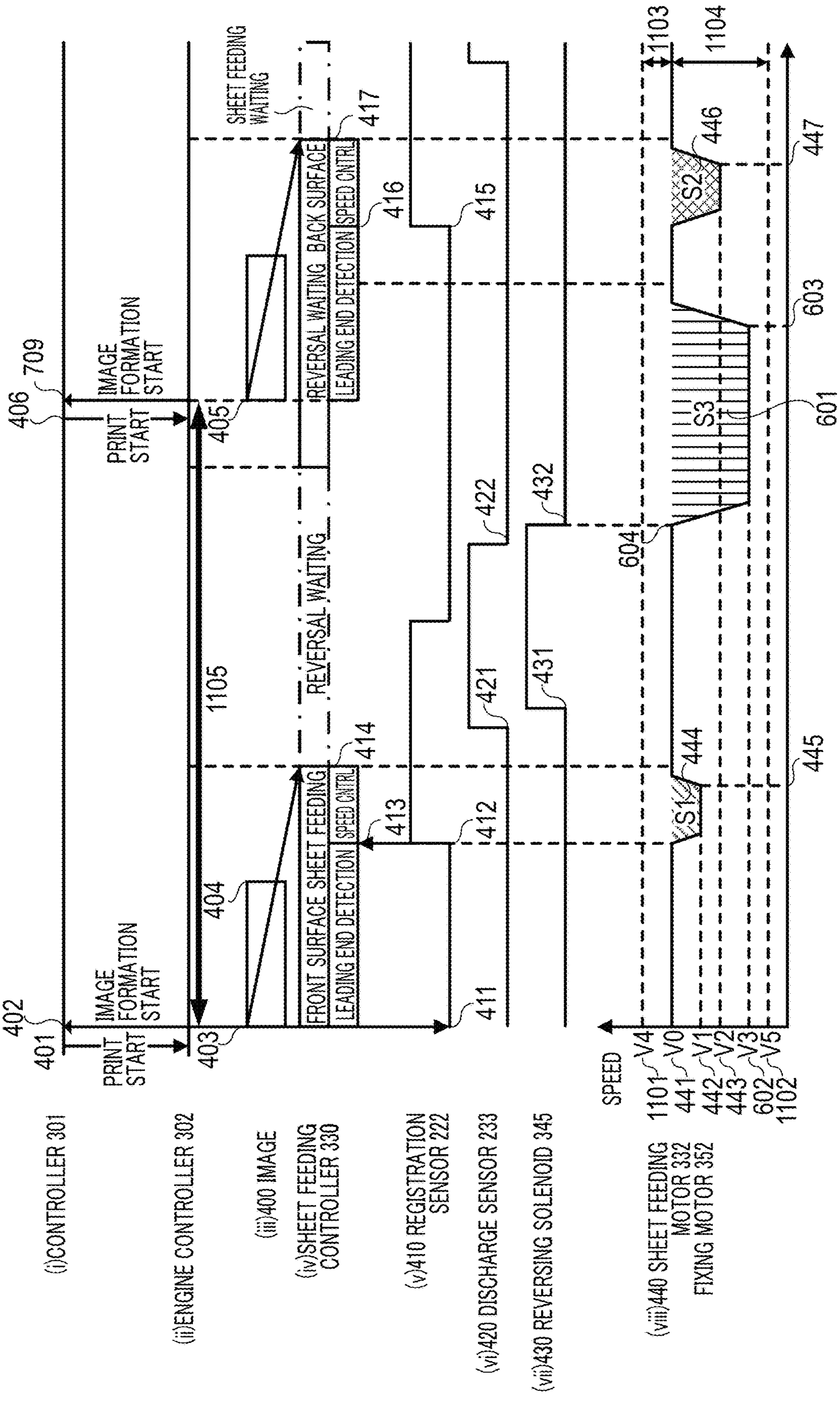
FIG. 13 is a timing chart showing conveying speed control during double-side printing of long paper in the embodiment 2.

FIG. 13 is a timing chart in the case where the control of the embodiment 2 was applied when in the case described in the reference embodiment 1 and the embodiment 1, the original transfer execution speed V0(441) is close to the maximum speed V4(1101) of the sheet feeding motor 332 and the fixing motor 352. A basic control operation is the same as those in the reference embodiment 1 and the embodiment 1 described with reference to FIGS. 7 and 11, and therefore, the same events are represented by the same reference numerals or symbols, and in this embodiment, a difference from FIGS. 7 and 11 will be described.

The sheet feeding/conveyance controller 330 compares differences 1103 and 1104 with each other at a timing (toner image formation start timing) of an image formation start instruction 402 for the front surface (first surface). Here, the difference 1103 is a difference between the original transfer execution speed V0(441) and the maximum speed V4(1101)

of the sheet feeding motor 332 and the fixing motor 352. The difference 1104 is a difference between the original transfer execution speed V0(441) and the minimum speed V5(1102) of the sheet feeding motor 332 and the fixing motor 352.

In the case of FIG. 13, the difference 1104 (between the transfer execution speed V0 and the minimum speed V5(1102)) is larger than the difference 1103. For this reason, the sheet feeding/conveyance controller 330 determines a timing of an image formation start instruction 709 as a time 1105 from the image formation start instruction 402 for the front surface so that the speed V3(602) can be made slower than the original transfer execution speed V0(441). This time 1105 is determined depending on the image forming condition so that the recording material R precedes the image at a timing 432 when the reversing solenoid 345 is drive-stopped.

Thereafter, the sheet feeding/conveyance controller 330 performs the conveyance of the recording material R, and determines, at the timing 432 when the reversing solenoid 345 is drive-stopped, a timing (603) when the speed is returned from the speed V3(602) slower than the transfer execution speed V0(441) to the original transfer execution speed V0(441). Thereafter, the sheet feeding/conveyance controller 330 changes the speed of the sheet feeding motor 332 and the fixing motor 352 to the speed V3(602) (604), and then executes the control described in the reference embodiment 1. As described above, in the case where the transfer execution speed V0 is close to the maximum speed V4, the speed V3 when the preceding amount S3 is eliminated is determined as a speed between the transfer execution speed V0 and the minimum speed V5(V5<V3<V0).

(Case Where Transfer Execution Speed V0 is Close to the Minimum Speed V5)

Figure 14:
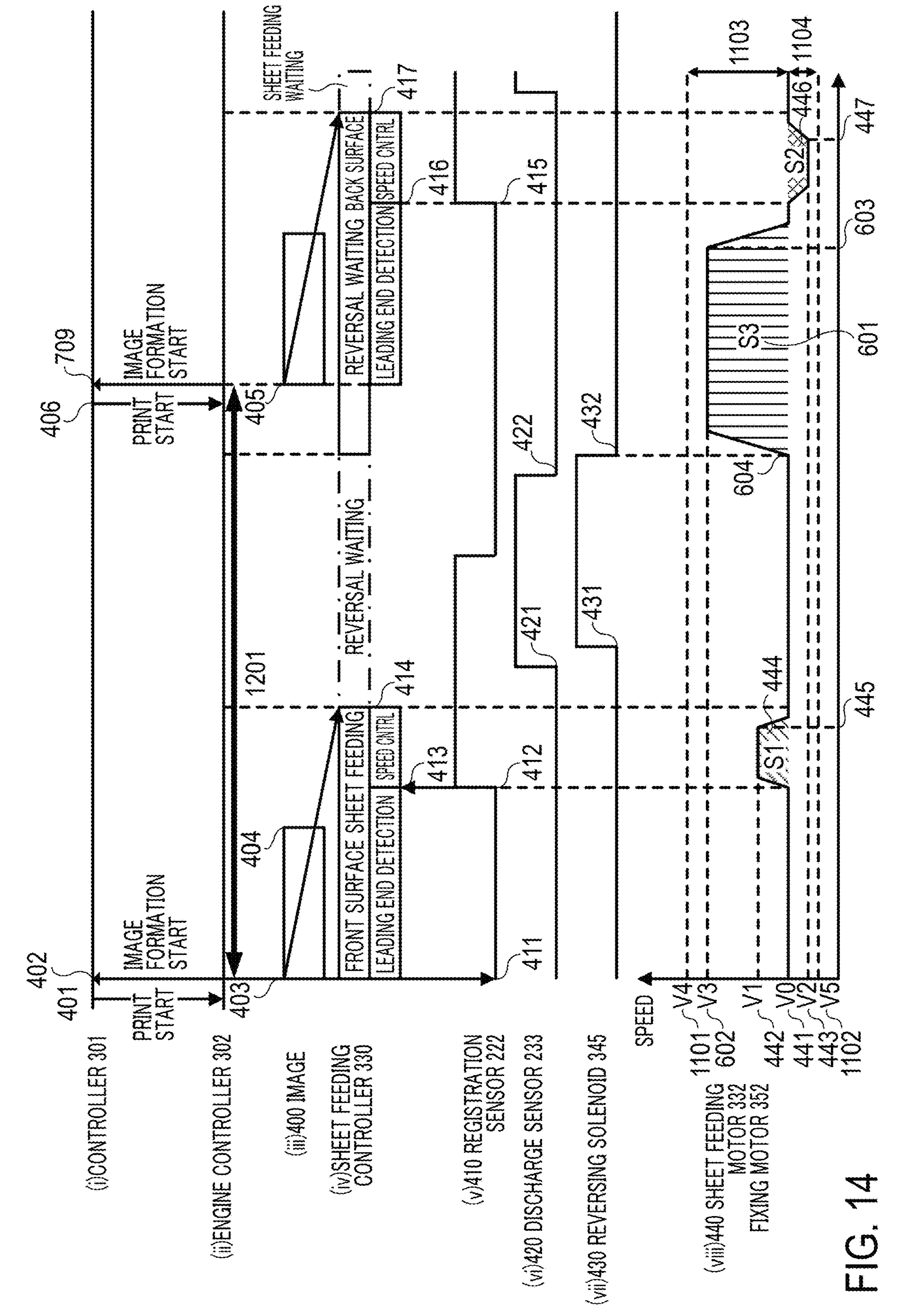
FIG. 14 is a timing chart showing another conveying speed control during the double-side printing of the long paper in the embodiment 2.

FIG. 14 is a timing chart in the case where the control of the embodiment 2 was applied when in the case described in the reference embodiment 1 and the embodiment 1, the original transfer execution speed V0(441) is close to the minimum speed V5 of the sheet feeding motor 332 and the fixing motor 352. A basic control operation is the same as that described with reference to FIG. 13, and therefore, the same events are represented by the same reference numerals or symbols, and in this embodiment, a difference from FIG. 13 will be described.

The sheet feeding/conveyance controller 330 compares differences 1103 and 1104 with each other at a timing of an image formation start instruction 402 for the front surface (first surface). Here, the difference 1103 is a difference between the original transfer execution speed V0(441) and the maximum speed V4(1101) of the sheet feeding motor 332 and the fixing motor 352. The difference 1104 is a difference between the original transfer execution speed V0(441) and the minimum speed V5(1102) of the sheet feeding motor 332 and the fixing motor 352. In the case of FIG. 14, the difference 1103 (between the transfer execution speed V0 and the maximum speed V4(1101)) is larger than the difference 1104. For this reason, the sheet feeding/conveyance controller 330 determines a timing of an image formation start instruction 709 as a time 1201 from the image formation start instruction 402 for the front surface so that the speed V3(602) can be made faster than the original transfer execution speed V0(441). This time 1201 is determined depending on the image forming condition so that the image precedes the recording material R at a timing 432 when the reversing solenoid 345 is drive-stopped.

Thereafter, the sheet feeding/conveyance controller 330 performs the conveyance of the recording material R, and determines, at the timing 432 when the reversing solenoid 345 is drive-stopped, a timing (603) when the speed is returned from the speed V3(602) faster than the transfer execution speed V0(441) to the original transfer execution speed V0(441). Thereafter, the sheet feeding/conveyance controller 330 changes the speed of the sheet feeding motor 332 and the fixing motor 352 to the speed V3(602) (604), and then executes the control described in the embodiment 1. As described above, in the case where the transfer execution speed V0 is close to the minimum speed V5, the speed V3 when the preceding amount S3 is eliminated is determined as a speed between the transfer execution speed V0 and the maximum speed V4(V0<V3<V4).

(Image Forming Timing Determination Processing)

Figure 15:
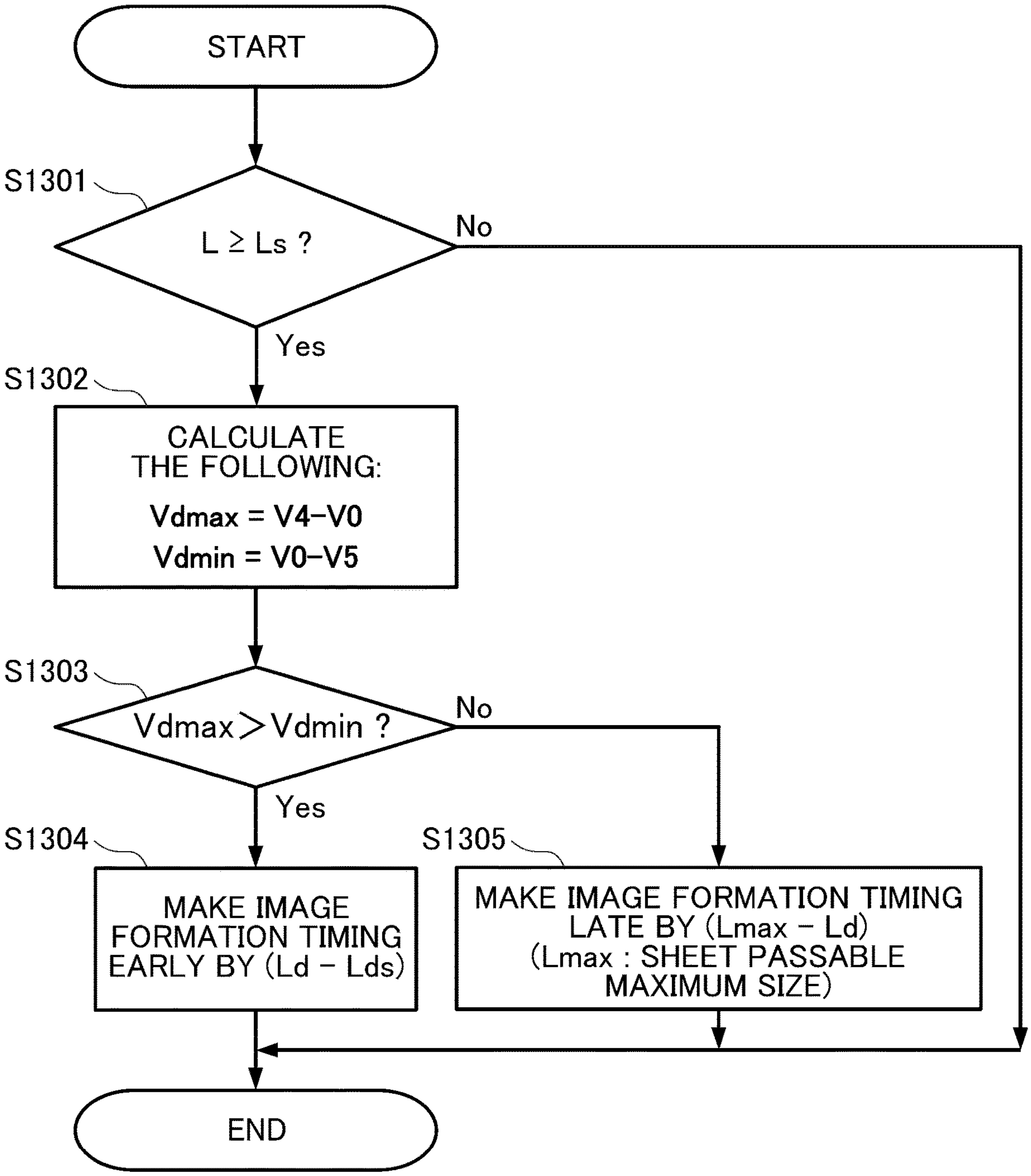
FIG. 15 is a flowchart showing the conveying speed control during the double-side printing of the long paper in the embodiment 2.

Using FIG. 15, a determination processing of the image forming timing for the back surface (second surface) described with reference to FIGS. 13 and 14 will be described. In S1301, the sheet feeding/conveyance controller 330 discriminates whether or not the length L of the recording material R is not less than the threshold Ls of a length of a recording material.

In the case where the sheet feeding/conveyance controller 330 discriminated in S1301 that the length L of the recording material R is less than the threshold Ls of the length of the recording material, the sheet feeding/conveyance controller 330 ends the processing. In this case, the sheet feeding/conveyance controller 330 discriminates that even when the recording material R is conveyed to the registration sensor 222, the length of the recording material R is not a length such that the recording material R is nipped by the reversing roller pair 230 operated by the fixing motor 352. On the other hand, in the case where the sheet feeding/conveyance controller 330 discriminated in S1301 that the length L of the recording material R is not less than the threshold Ls, the sheet feeding/conveyance controller 330 causes the processing to go to S1302. In this case, the sheet feeding/conveyance controller 330 discriminates that when the recording material R is conveyed to the registration sensor 222, the length L of the recording material R is a length such that the recording material R is also nipped by the reversing roller pair 230 operated by the fixing motor 352.

In S1302, the sheet feeding/conveyance controller 330 calculates a difference Vdmax (=V4−V0) and difference Vdmin (=V0−V5). Incidentally, the difference Vdmax is a difference between the transfer execution speed V0 and the maximum speed V4 (upper limit) of the sheet feeding motor 332 and the fixing motor 352, and controllers to the above-described difference 1103. Further, the difference Vdmin is a difference between the transfer execution speed V0 and the minimum speed V5 (lower limit) of the sheet feeding motor 332 and the fixing motor 352, and controllers to the above-described difference 1104.

In S1303, the sheet feeding/conveyance controller 330 compares the difference Vdmax with the difference Vdmin which are calculated in S1302. In the case where the sheet feeding/conveyance controller 330 discriminated in S1303 that Vdmax>Vdmin holds, the sheet feeding/conveyance controller 330 causes the processing to go to S1304. This status corresponds to the status described with reference to FIG. 14. In S1304, the sheet feeding/conveyance controller 330 makes the image forming timing early correspondingly to a difference (Ld−Lds) between an image length Ld and an image length threshold Lds, and then ends the processing. Here, the image length threshold Lds is the same length as the above-described recording material length threshold Ls.

By this, a state in which the image precedes the recording material R is formed at a timing when the preceding amount of the recording material R and the image is calculated, so that the sheet feeding/conveyance controller 330 selects, as the conveying speed V3 for the reversing path, a speed faster than the original transfer execution speed V0. Incidentally, as an example, an amount in which the image forming timing is made early was the difference between the length Ld of the image and the image leading end threshold Lds, but is not limited thereto. When the image forming timing is an image forming timing such that as the conveying speed V3 for the reversing path, the speed faster than the original transfer execution speed V0 is selected, the conveying speed V3 for the reversing path may be determined depending on the image forming condition.

On the other hand, in the case where the sheet feeding/conveyance controller 330 discriminated in S1303 that Vdmax≤Vdmin holds, the sheet feeding/conveyance controller 330 causes the processing to go to S1305. This status controllers to the status described with reference to FIG. 14. In S1305, the sheet feeding/conveyance controller 330 makes the image forming timing late correspondingly to a difference (Lmax−Ld) between a sheet passable maximum size Lmax and the image length Ld, and then ends the processing. The sheet passable maximum size Lmax is a length of a maximum recording material R, in the conveying direction, on which the image is printable by the image forming apparatus 200.

By this, a state in which the recording material R precedes the image is formed at a timing when the preceding amount of the recording material R and the image is calculated, so that the sheet feeding/conveyance controller 330 selects, as the conveying speed V3 for the reversing path, a speed slower than the original transfer execution speed V0. Incidentally, as an example, an amount in which the image forming timing is made late was the difference between the sheet passable maximum size Lmax and the image leading end Ld, but is not limited thereto. When the image forming timing is an image forming timing such that as the conveying speed V3 for the reversing path, the speed slower than the original transfer execution speed V0 is selected, the conveying speed V3 for the reversing path may be determined depending on the image forming condition. The above-described control of S1304 or S1305 controllers to the fourth control.

As described above, in the embodiment 2, on the basis of the transfer execution speed V0, the image forming timing for the back surface is changed. By this, the conveying speed V3 for the reversing path V3 can be detected within a range between the maximum speed V4 and the minimum speed V5 of the sheet feeding motor 332 and the fixing motor 352. Further, in the case where the change in image forming timing cannot be made due to the image forming condition or the like and the image formation is delayed, the control (third control) of the reference embodiment 2 may be carried out. Incidentally, the embodiment 2 does not limit the invention according to the appended claims, and in addition, all the features described in the embodiment 2 are not essential to solution of the invention.

As described above, according to the embodiment 2, in the image forming apparatus in which conveyance of the recording material R is performed by the plurality of driving sources, the image formation can be normally carried out without influencing the recording material.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-008136 filed on Jan. 23, 2024, which is hereby incorporated by reference herein in its entirety.

What is claimed is:

1. An image forming apparatus comprising:

a photosensitive drum configured to carry a toner image;

a first roller configured to convey a recording material;

a first motor configured to drive the first roller;

a second roller configured to convey the recording material conveyed by the first roller;

a second motor configured to drive the second roller, the second motor being different from the first motor;

an intermediary transfer member onto which the toner image is transferred from the photosensitive drum;

a transfer member configured to transfer the toner image from the intermediary transfer member onto the recording material;

a sensor unit provided on a side upstream of the transfer member with respect to a conveying direction of the first roller; and a controller, wherein the controller is capable of executing (1) first control for controlling a recording material conveying speed by controlling the first motor on the basis of the sensor unit and (2) second control for controlling the recording material conveying speed by controlling the first motor and the second motor before executing the first control, and wherein the controller controls the first motor and the second motor in the second control so that a recording material conveying speed of the recording material positioned on a side upstream of the sensor unit with respect to the conveying direction of the first roller is decelerated or so that conveyance of the recording material is stopped and then the recording material conveying speed is accelerated.

2. An image forming apparatus according to claim 1, further comprising an image forming unit including the photosensitive drum and configured to form the toner image on the intermediary transfer member, wherein on the basis of a preceding distance in which the recording material precedes the toner image, the controller acquires a first speed of the first motor and the second motor in the second control and a timing of returning a first speed to a second speed.

3. An image forming apparatus according to claim 2, wherein in a case where the recording material precedes the toner image even when the first speed is a slowest speed of speeds of the first motor and the second motor in the second control, the controller executes third control in which the first motor and the second motor are stopped so as to stop conveyance of the recording material before a leading end of the recording material reaches the sensor unit.

4. An image forming apparatus according to claim 3, further comprising a fixing device including a heater and configured to fix the toner image, on the recording material, transferred from the intermediary transfer member, wherein the second motor drives the fixing device and the second roller and is configured to rotate the second roller in a first direction and a second direction opposite to the first direction, and wherein the fixing device is lowered in temperature of the heater during a stop of a drive thereof by the second motor.

5. An image forming apparatus according to claim 4, wherein the controller acquires a stop time in which the conveyance of the recording material is stopped, and a recovering time until a temperature of the heater lowered during the stop time is recovered to a temperature before the temperature of the heater is lowered, and wherein the controller determines a timing of stopping the first motor and the second motor in the third control so that the recording material reaches the fixing device after a lapse of the recovering time.

6. An image forming apparatus according to claim 1, wherein the sensor unit includes a contact portion for correcting oblique movement of the recording material in contact with the recording material.

* * * * *